United States Patent
Pettersson

(10) Patent No.: US 9,153,388 B2
(45) Date of Patent: Oct. 6, 2015

(54) SEALED MONOLITHIC ELECTROCHEMICAL SYSTEM

(75) Inventor: Henrik Pettersson, Vastra Frolunda (SE)

(73) Assignee: Dyenamo AB, Taby (SE)

(*) Notice: Subject to any disclaimer, the term of this patent is extended or adjusted under 35 U.S.C. 154(b) by 758 days.

(21) Appl. No.: 12/735,520

(22) PCT Filed: Jan. 29, 2009

(86) PCT No.: PCT/EP2009/000567
§ 371 (c)(1),
(2), (4) Date: Jul. 23, 2010

(87) PCT Pub. No.: WO2009/095233
PCT Pub. Date: Aug. 6, 2009

(65) Prior Publication Data
US 2010/0300534 A1 Dec. 2, 2010

(30) Foreign Application Priority Data
Jan. 30, 2008 (EP) .................................. 08150835

(51) Int. Cl.
*H01G 9/20* (2006.01)
*H01L 31/05* (2014.01)

(52) U.S. Cl.
CPC .......... *H01G 9/2081* (2013.01); *H01G 9/2031* (2013.01); *H01G 9/2059* (2013.01); *H01G 9/2077* (2013.01); *Y02E 10/542* (2013.01)

(58) Field of Classification Search
CPC .. H01G 9/2068; H01G 9/2081; H01L 31/044; H01L 31/0443; H01L 31/0201; H01L 31/0213; H01L 31/0465
USPC .............. 136/259, 293; 257/E31.117; 438/66
See application file for complete search history.

(56) References Cited

U.S. PATENT DOCUMENTS 6,350,944 B1* 2/2002 Sherif et al. .................. 136/244
6,452,776 B1 9/2002 Chakravorty
(Continued)

FOREIGN PATENT DOCUMENTS

EP 1445782 A2 8/2004
EP 1840916 A1 10/2007
(Continued)

OTHER PUBLICATIONS

International Search Report.
(Continued)

*Primary Examiner* — Jonathan Johnson
*Assistant Examiner* — Andrew Golden
(74) *Attorney, Agent, or Firm* — Harness, Dickey & Pierce

(57) ABSTRACT

A sealed monolithic electrochemical system is disclosed. In at least one embodiment, the sealed monolithic electrochemical system includes an electrically insulating substrate; an electrically conducting pattern arranged to support a plurality of blocks of porous structures arranged on the substrate, wherein each porous structure includes a working electrode, an insulating layer and a counter electrode, and wherein an electrolyte is at least partially filled in the blocks of porous structures for forming a plurality of electrochemical cells; and an encapsulation covering the plurality of blocks of porous structures. In at least one embodiment, each block includes at least one porous structure, where the blocks may be individually disconnected and a method individually disconnecting such a system.

21 Claims, 10 Drawing Sheets

(56) References Cited

U.S. PATENT DOCUMENTS

| | | |
|---|---|---|
| 6,593,520 B2 | 7/2003 | Kondo et al. |
| 2004/0099303 A1 | 5/2004 | Pettersson et al. |
| 2004/0144043 A1* | 7/2004 | Stevenson et al. ........... 52/173.3 |
| 2007/0089779 A1 | 4/2007 | Balasubramanian et al. |
| 2008/0142071 A1* | 6/2008 | Dorn et al. .................... 136/245 |

FOREIGN PATENT DOCUMENTS

| | | | |
|---|---|---|---|
| JP | 2007194039 A | 8/2007 | |
| WO | WO-9716838 A1 | 5/1997 | |
| WO | WO-0197237 A1 | 12/2001 | |
| WO | WO-2004038745 A2 | 5/2004 | |

OTHER PUBLICATIONS

English translation of Office Action for corresponding Korean Application No. 10-2010-7018731 dated Dec. 24, 2014.

* cited by examiner

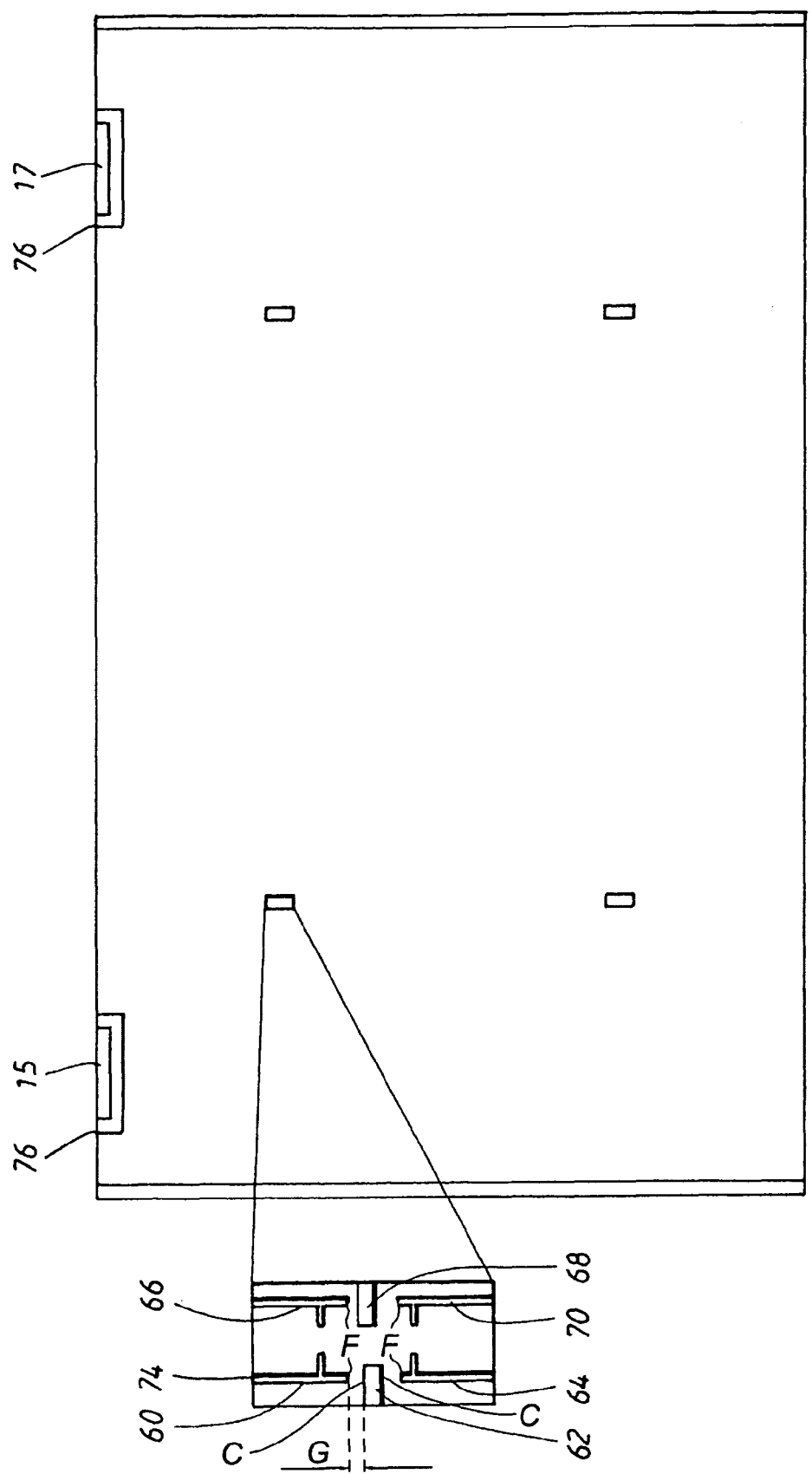

SEALED MONOLITHIC ELECTROCHEMICAL SYSTEM

TECHNICAL FIELD

The present invention relates to a sealed monolithic electrochemical system comprising an electrically insulating substrate, an electrically conducting pattern including carrier areas and contact portions arranged to support a plurality of blocks of porous structures arranged on said substrate, where each porous structure comprises a working electrode, an insulating layer and a counter electrode, wherein an electrolyte is at least partially filled in said blocks of porous structures for forming a plurality of electrochemical cells and an encapsulation covering said plurality of blocks of porous structures, wherein each block includes at least one porous structure; said plurality of blocks being connected in series wherein at least one counter electrode in a block is connected to at least one working electrode in the following block, and said plurality of blocks is arranged in a matrix of series-connected blocks.

The invention further relates to a method of operating a sealed monolithic electrochemical system comprising the method steps of: (a) providing an electrically insulating substrate, (b) arranging an electrically conducting pattern including carrier areas arranged to support a plurality of blocks of porous structures on said substrate, forming said plurality of porous structures on top of said conducting pattern, where each porous structure comprises a working electrode, an insulating layer and a counter electrode, wherein each block includes at least one porous structure and said plurality of blocks being connected in series wherein at least one counter electrode in a block is connected to at least one working electrode in the following block, said plurality of blocks being arranged in a matrix of series-connected blocks, (c) depositing an electrolyte to at least partially fill in said blocks of porous structures for forming a plurality of electrochemical cells and (d) covering said plurality of blocks of porous structures with an encapsulation.

BACKGROUND ART

The limited supply of fossil fuels and the problems that arise upon combustion of such fuels have caused intensive research in order to find alternative energy sources, such as wind, water, solar and nuclear energy. Using solar cells to convert solar radiation energy into electric energy is a promising method for achieving emission-free and renewable production of electricity.

Solar cell technologies can be divided into first, second or third generation. First generation solar cells are based on silicon. These solar cells have quite high degree of efficiency. However, the supply of the required high-quality silicon is at present limited and not sufficient for the fast growth of the industry. Moreover, the silicon solar cells are too expensive to manufacture and are therefore not yet close of being economically competitive with conventional sources of energy.

The solar cells of the second generation are so-called thin layer solar cells, e.g. CIS or CIGS solar cells. Using this type of solar cells allows reducing the material consumption and thus the manufacturing costs, since the layer of the semi-conducting material is very thin (<1 µm). The layer is applied directly on a substrate by e.g. vaporization. The size of the produced module is therefore no longer limited by the size of the silicon wafer sheet, and the module can thus be widely varied depending on the device design and the size of the glass sheet of choice. Additionally, very high efficiencies have been obtained. The drawbacks of the technology are the extremely high investment cost for initiating production, and the difficulty to reduce the costs to a level where the products financially may compete with conventional energy sources.

The third generation solar cells may be defined as the ones being in the R&D phase, with the ambition of lowering the costs for producing electricity from solar energy. One of the most-promising technologies of the third generation solar cells are photo-electrochemical systems, also known as dye-sensitized solar cells. These cells comprise a nanoporous semi-conducting material that is soaked with a light-absorbing dye, a counter electrode and an electrolyte. The potential of photo-electrochemical systems is defined by especially three factors: a low investment cost for initiating production, a lack of significant cost barriers that cannot be broken, and a flexible design, allowing manufacturing of devices of different size. Despite that the efficiencies of dye-sensitised solar cells still are lower than the ones obtained with the first and second generation solar cells, there is a high potential that the overall costs for generating electricity from solar cells may become competitive with conventional energy sources.

Monolithic electrochemical systems are photo-electrochemical systems where the working electrode and the counter electrode are assembled in a single integrated body, and are previously known in the art. The working electrode and the counter electrode are separated by means of an intermediate layer of a porous insulating material. The working and the counter electrodes are made of porous structures and an electrolyte is at least partially filled in the porous structure, which is a monolith comprising a layer forming the working electrode, a layer forming the counter electrode and an insulating layer separating the counter electrode from the working electrode.

An early example of a monolithic photo-electrochemical system is disclosed in WO97/16838 that describes a battery of photovoltaic cells consisting of a monolithic assembly of a plurality of serial-connected photovoltaic cells. Traditionally photo-electrochemical systems include a first substrate provided with a first electrode and a second substrate provided with a second electrode. The first and second substrates are positioned so that the electrodes are facing each other and separated by a small gap in between. In order to ensure that the gap is of a magnitude within a desired range, a spacer can be used to separate the substrates by a certain distance. The system is sealed at the edges of the first and second substrate and between adjacent cells to prevent the electrolyte from making connections between the cells, and/or to avoid unwanted contact between the electrolyte and current collectors of the cells. In order to create photo-electrochemical systems having uniform properties over the entire active area of the system, it is essential that the distance between the electrodes is kept within a narrow range, which aggravates production. Another important aspect to keep in mind is that the electrolyte should be prevented from making contacts between adjacent serial-connected cells. The horizontal and vertical positioning of the two substrates must thus be made with very high precision, which also makes production difficult. A further drawback with this traditional, bilithic type of photo-electrochemical systems is that the electrolyte normally is introduced after assembly of the system. The openings of the passages where the electrolyte is introduced must be well sealed after the introduction of the electrolyte to prevent the electrolyte from leaking and to protect the cell against penetration by water or impurities. Also, separate openings are required for each cell resulting in a large number of openings for a system with many cells. Besides, introduction of electrolyte through narrow passages into the essentially closed space between the substrates may lead to creation of air pockets in the system or to uneven distribution of electrolyte. All these factors make production difficult and may deteriorate the quality of the system.

Monolithic electrochemical systems allow very compact and simple design, eliminating the need for the first substrate being positioned at a specific distance from the second substrate. In this case, the electrochemical system can be constructed by applying a multi-layer structure to a substrate, after which the electrochemical system is closed. Electrolyte is preferably introduced before closing the electrochemical system. The structure can suitably be closed by means of a flexible sheet of at least one polymer layer, which is preferably applied to said structure in the presence of heat and sub-atmospheric pressure.

Experiments have shown that it is difficult to manufacture arrays of monolithic photo-electrochemical cells so that the cells have identical properties or properties within a desired range, even though they are manufactured simultaneously on the same substrate. A single photo-electrochemical cell is characterised by its current-voltage-characteristics. The current-voltage-characteristics for a cell vary with the light intensity and the light spectrum. Important parameters that describe the current-voltage-characteristics of a photo-electrochemical cell are the short-circuit current ($I_{sc}$), the open-circuit voltage ($U_{oc}$), and the maximum power point ($P_{max}$). The term fill-factor (ff) is often used to describe the curve as ff=$P_{max}/(U_{oc}*I_{sc})$. In order to reduce differences in the current-voltage-characteristics of individual cells arranged on a common substrate, the production requires high purity of the chemical components and clean production environment and production processes. Such measures lead to a much more expensive production. An important example is the necessity of having a perfect control of the deposition of the working electrode, the insulating layer and the counter electrode, in order to prevent the counter electrode from partially penetrating the insulating layer and by that touching the working electrode and/or the intermediate conducting layer on the substrate, causing energy losses and thus differences of the current-voltage characteristics of the individual cells on a common substrate. This becomes even more critical since a thin insulating spacer layer is desirable in order to obtain the best cell performance by facilitating the diffusion of the redox-couple electrolyte between the working and the counter electrodes. Another important example is the necessity of having a perfect control of the encapsulation procedure to avoid defects such as pinholes. Pinholes may create unwanted contact between the electrolyte and current collectors in the device leading to decreased efficiency and/or stability. It may also lead to electrolyte wandering from one cell to another, so-called electrophoresis. The problem with defects in the encapsulation becomes more difficult as the size of the solar device increases.

Since the technique for manufacturing monolithic photo-electrochemical systems is relatively inexpensive, the costs for production of large structures of solar cells are quite low. Considering the experimental experiences above implies, however, that the failure frequency of single cells is quite high. In the case where cells are serial-connected, the errant cells might work in negative direction, i.e. a negative voltage value is obtained for a given current value. If the decrease of performance is large due to the errant cells, the system must be discarded, which leads to decreased production yield and increased production costs. A reduced performance of the photo-electrochemical system may also be obtained due to different ageing of the cells and/or partial shading of the system, where in both cases, cells may work in negative direction since they produce too little current in relation to the other cells in the system.

A solution to this problem might be a disconnection of errant cells in a photo-electrochemical module system.

Disconnection of solar battery strings in case of ground fault is previously disclosed in the U.S. Pat. No. 6,593,520. The document describes a solar battery string formed by a plurality of series-connected solar panels, a detector for outputting an abnormality detection signal upon detection of a ground fault in the solar battery string, and at least one intermediate switch provided midway along the string that is shifted to an open state by the abnormality detection signal. Outputs from the solar battery strings are collected by the collector box comprising intermediate switches, string switches, ground fault abnormality detectors and the like. In other words, all the strings are connected to an external controlling device.

SUMMARY OF THE INVENTION

An objective of the invention is to provide a monolithic photo-electrochemical system comprising a plurality of cells arranged on a common substrate, which monolithic photo-electrochemical system has improved production yield and efficiency in relation to prior art systems without imposing stricter requirements on the production processes, thereby enabling cost effective production of such electrochemical systems.

This object is achieved by a monolithic system as disclosed in claim 1.

The contact means included in the system allow individual disconnection of blocks before and/or after sealing of the system is made while maintaining a high surface efficiency. This is possible since the terminals for disconnecting an element are located beside the block, which it serves.

Said monolithic photo-electrochemical system is in one embodiment provided with a diode connected to said contact means in order to ensure disconnection of a block if the block starts to operate in a reverse direction.

Disconnection of a block may also be made by closing the terminal is by application of a soldering point forming a short-circuit path or by application of a metallic pin.

The disconnection may be made before or after the system has been encapsulated.

The size of the matrix is m×n, where m and n are integers such that there are inner blocks without contact with the edge of the matrix, i.e. m and n are equal to or greater than 3.

Further the matrix may include a plurality of quadruples of blocks, each having an inner intersection area. A quadruple of blocks is formed by an upper left block, upper right block, lower left block and lower right block. The inner intersection area being a small area having a centre where a vertical passage separates two columns of blocks and a horizontal passage separates two consecutive blocks in a column of blocks. The contact means are arranged in said inner intersection area.

In order to provide access to said terminals, a lead through the substrate or through the encapsulation covering is provided in the inner intersection area.

The present invention also provides a method of operating a sealed monolithic photo-electrochemical system according to claim 19.

BRIEF DESCRIPTION OF THE DRAWINGS

FIG. 19 is a schematic view seen from the encapsulation side of the matrix of 16 serial-connected blocks shown in FIGS. 17 and 18, comp where each block can be disconnected by contacting the inner contact points through the openings in the encapsulation material before or after the sealing.

Figure 1:
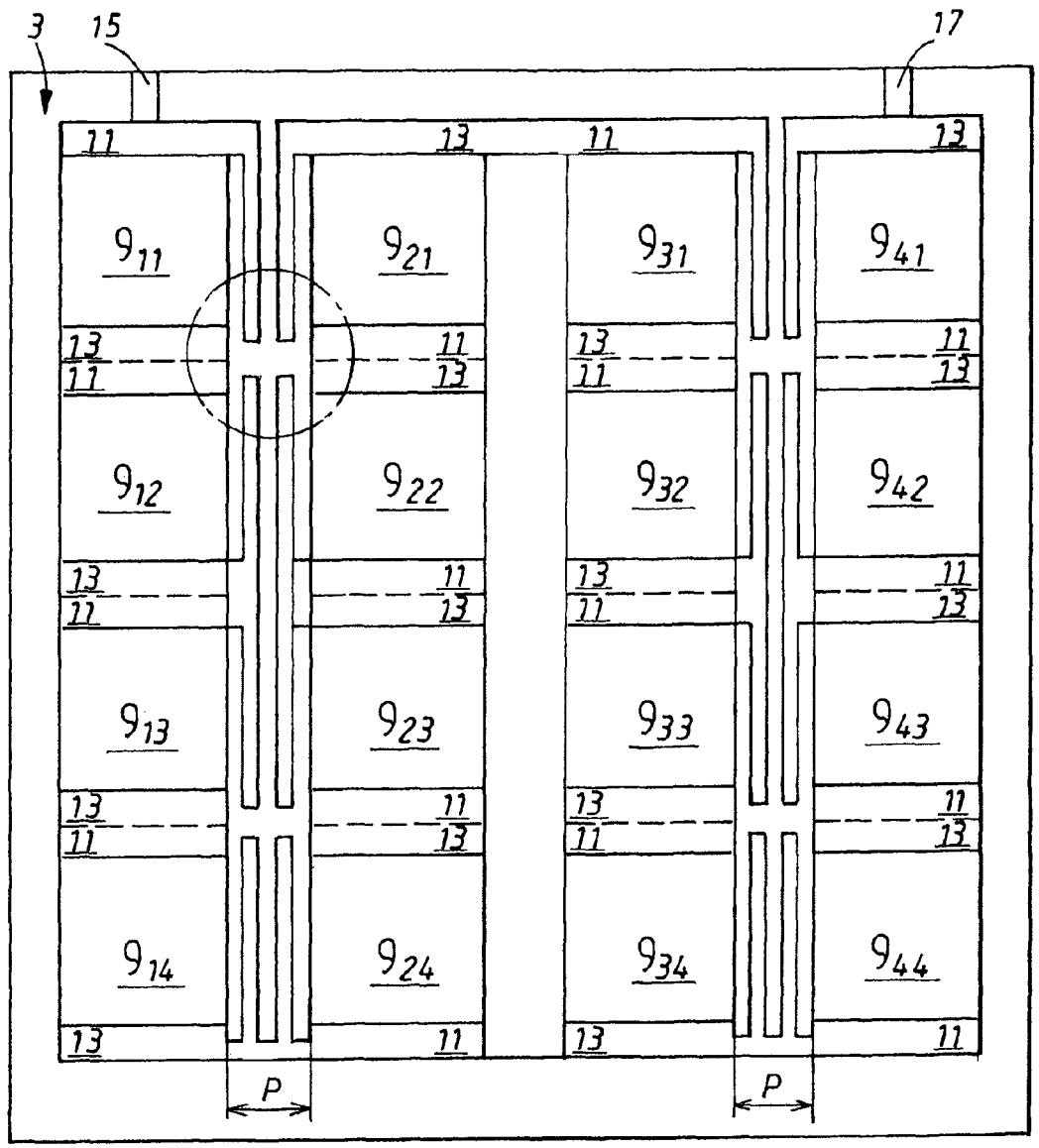
FIG. 1 is a schematic view of a matrix of 16 serial-connected blocks where each block can be disconnected by contacting the inner contact point.

The drawings described are only schematic and are non-limiting. In the drawings, the size of some of the elements may be exaggerated and not drawn to scale for illustrative purposes. In particular the thickness dimension of the plurality of layers including carrier areas, counter electrode, insulating layer, and working electrode are greatly exaggerated in comparison to the horizontal extension of each layer. A second example is that the width of the layers and the current collectors in the horizontal dimensions do not necessarily have the right proportions in relation to another.

DETAILED DESCRIPTION

In FIG. 1 a schematic top view of a monolithic electrochemical system 1 is shown. The monolithic electrochemical system is formed in a conventional manner on an electrically insulating substrate 3. On the electrically insulating substrate 3, an electrically conducting pattern 5 (FIG. 3) is arranged to support a plurality of blocks $9_{11} \ldots 9_{44}$ of porous structures arranged on said substrate 3. With top view is here intended that the view is seen from the side of the system having the substrate as a background. Since the encapsulation is not present it is possible to see the counter electrodes of the system.

The plurality of blocks $9_{11} \ldots 9_{44}$ is arranged in a matrix of series-connected blocks $9_{11} \ldots 9_{44}$. A first column of blocks $9_{1i}$ is connected in series from top to bottom in the FIG. 1. At the end of the column, the block $9_{14}$ situated at the bottom is connected to block $9_{24}$ situated at the bottom of the next column of blocks. A second column of blocks $9_{2i}$, is connected in series from bottom to top in the FIG. 1, starting with the block the block $9_{24}$ situated at the bottom and ending with the block $9_{21}$ situated at the top of the second column of blocks $9_{2i}$. The second column of blocks $9_{2i}$ is thus connected in series from bottom to top in the FIG. 1 The block $9_{21}$ situated at the top of the second column of blocks $9_{2i}$ is connected to the block $9_{31}$ situated at the top of the third column of blocks $9_{3i}$. The third column of blocks $9_{3i}$ is connected in series from top to bottom in the FIG. 1. At the end of the column, the block $9_{34}$ situated at the bottom is connected to block $9_{44}$ situated at the bottom of the fourth column of blocks $9_{4i}$. The fourth column of blocks $9_{4i}$, is connected in series from bottom to top in the FIG. 1, starting with the block $9_{44}$ situated at the bottom and ending with the block $9_{41}$ situated at the top of the fourth column of blocks $9_{4i}$. The fourth column of blocks $9_{4i}$ is thus connected in series from bottom to top in the FIG. 1

The blocks are thus arranged in series in a zick-zack pattern leading from top to bottom and from bottom to top alternating for each consecutive column. The blocks will cover essentially the whole substrate 3. The aim is to create a fill area, defined as the area of electrochemical cells divided by the total area of the substrate, exceeding 70%, preferably exceeding 90%, for a system having a matrix of blocks of size 4×4 or more.

Each block includes an incoming current collector 11 and an outgoing current collector 13. The incoming current collector 11 of the first block $9_{11}$ in the first column $9_{1i}$ is connected to a first terminal 15 of the electrochemical system 1, while the outgoing current collector of the last block $9_{41}$ in the last column $9_{4i}$ is connected to a second terminal 17 of the electrochemical system 1. In the example disclosed in FIG. 1, the electrochemical system includes an even number of columns, 4, whereby the last block in the last column is positioned at the top of the last column, just as the first block is positioned at the top of the first column. Both terminals are thus positioned on the same side of the electrochemical system. In the event the electrochemical system would include an odd number of columns, the terminals would be positioned on opposite sides of the electrochemical system.

An incoming current collector 11 of a block $9_{ij}$ extends along the width of the block and is connected to one or more working electrodes arranged in the block $9_{ij}$, while an outgoing current collector of a block $9_{ij}$ extends along the width of the block and is connected to one or more counter electrodes arranged in the block $9_{ij}$. Except for the last block in the last row, in the example given in FIG. 1, block $9_{41}$, the outgoing current collector 13 of a block $9_{ij}$ is connected to an incoming current collector 11 of a next consecutive block, which would be block $9_{ij+1}$ in the event the next consecutive block is in the same column and placed under block $9_{ij}$, block $9_{ij-1}$ in the event the next consecutive block is in the same column and placed above block $9_{ij}$, and block $9_{i+1j}$ in the event the consecutive block is in the next column.

Preferably an outgoing current collector 13 and an incoming current collector 11 located between two consecutive blocks $9_{ij}$ and $9_{ij+1}$ in the same column of blocks are constituted by a single structure element.

The incoming and outgoing current collectors are arranged to allow current to pass at low ohmic energy losses. The incoming and outgoing current collectors 11, 13 are therefore preferably constituted by metallic conductors.

As previously mentioned, the blocks in a column of blocks are connected in series in vertical direction from top to bottom or bottom to top, depending on the number of the column. The incoming and outgoing current collectors 11, 13 will be extending along the width of each block, that is the incoming and outgoing current collectors 11, 13 will be extending in a horizontal direction.

Figure 2:
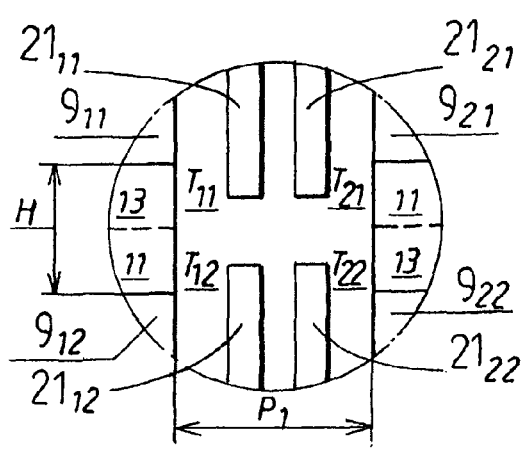
FIG. 2 shows details of contact means for an intersection area for a quadruple of blocks.

According to the invention contact means 19 are provided for allowing individual disconnection of each block after said plurality of electrochemical cells have been sealed by said encapsulation, said disconnection being formed by connecting an incoming current collector 11 of a block with an outgoing current collector 13 of the same block, thereby short-circuiting the block. In FIG. 2, the contact means 19 are shown in detail.

For this purpose the contact means 19 include a conductor $21_{ij}$ for each block $9_{ij}$ located in a passage P separating two columns of blocks $9_{ij}$ and $9_{i+1j}$. The conductor $21_{ij}$ extends along a side of a block $9_{ij}$ from an incoming current collector 11 or an outgoing current collector 13 of the block $9_{ij}$, depending on the location of the block, toward an outgoing current collector 13 or an incoming current collector 11 of the same block $9_{ij}$ to thereby create a terminal $T_{ij}$ for each block. $9_{ij}$. The conductor $21_{ij}$ extends to a free end F of the conductor $21_{ij}$, which free end F is located at a short distance from a contact part C of an incoming or outgoing current collector 11, 13 of the same block $9_{ij}$. The conductor thus has an attached end connected to either of the incoming or outgoing current collector 11, 13 and a free end F, which is located in the vicinity of contact part C of the other of an incoming or outgoing current collector 11, 13. The terminal $T_{ij}$ is thus a connection point between the free end F of conductor $21_{ij}$ of a block $9_{ij}$ located in a passage P separating two columns of blocks and $9_{ij}$ and $9_{i+1j}$ and a contact part C of an incoming or outgoing current collector 11, 13 of the same block $9_{ij}$. In the event the conductor $21_{ij}$ of a block $9_{ij}$ is connected to an incoming current collector 11, the conductor $21_{ij}$ will extend from the incoming current collector 11 towards the contact part C of outgoing current collector 13 of the same block $9_{ij}$. The contact part is a part of the incoming or outgoing current collector 11, 13 which may extend into a passage P separating two columns of blocks $9_{ij}$ and $9_{i+1j}$. In this case the terminal $T_{ij}$ is thus a connection point between the conductor $21_{ij}$ of a block $9_{ij}$ located in a passage P separating two columns of blocks $9_{ij}$ and $9_{i+1j}$ and the contact part C of an outgoing current collector 13 of the same block $9_{ij}$. In the event the conductor $21_{ij}$ of a block $9_{ij}$ is connected to an outgoing current collector 13, the conductor $21_{ij}$ will extend from the outgoing current collector 13 toward the contact part C of the incoming current collector 11 of the same block $9_{ij}$. In this case the terminal $T_{ij}$ is thus a connection point between the conductor $21_{ij}$ of a block $9_{ij}$ located in a passage P separating two columns of blocks and $9_{ij}$ and $9_{i+1j}$ and an incoming current collector 11 of the same block $9_{ij}$. With connection point is here intended a narrow gap G separating the conductor $21_{ij}$ from the incoming current collector 11 or outgoing current collector 13, depending on to which of these the conductor $21_{ij}$ is connected at its other end where the gap G is not situated. The gap G should only be a small fraction of the length of a conductor. The gap should be convenient to close by formation of a soldering point or by introduction of a small metallic pin. Suitably the gap G is of the same magnitude as the width of the conductor. In the event the gap G is closed by introduction of a diode, the gap is of the size of the diode.

The contact part C, the gap G and the free end F are indicated in FIG. 19.

The incoming current collector 11, the conductor $21_{ij}$ and the outgoing current collector 13 ensure that a block can be by-passed at low ohmic energy losses in the event the terminal $T_{ij}$ of a block $9_{ij}$ is closed. In order to achieve low ohmic energy losses, the incoming current collector 11 and the outgoing current collector 13 have metallic conducting properties and extend along the width of the block $9_{ij}$ allowing electron transport in the horizontal direction at low ohmic losses. The conductor extends in the passage between columns of blocks along the block in order to allow by-passing of a block in the event the terminal $T_{ij}$ of a block $9_{ij}$ is closed.

When the terminal $T_{ij}$ of a block $9_{ij}$ is closed, the block is thus circumvented by metallic conductors along its width on the incoming and outgoing side, and on a third side connecting the incoming and outgoing side. Hence, when the terminal $T_{ij}$ of a block $9_{ij}$ is closed, the incoming current collector 11, the conductor $21_{ij}$, the outgoing current collector 13 and the closed terminal $T_{ij}$ forms a bracket, [or], of metallic conductors partially enclosing the block where one side of the block in the vertical direction may be open.

In summary, a contact means 19 includes an incoming current collector 11 extending along the width of a block, an outgoing current collector 13 extending along the width of the block on the opposite side and a conductor $21_{ij}$ being connected with one of the incoming and outgoing current collector 11, 13 and extending toward the other of the incoming and outgoing current collector 11, 13 to at a short distance from said other of the incoming and outgoing current collector 11, 13 form a terminal $T_{ij}$ of a block where the block may be by-passed. Here by the "width" of the block is intended an extension of the block in a direction vertical to a general direction in which a column of series connected blocks are directed. In FIG. 1, the general direction in which a column of series connected blocks are directed is a vertical direction running from top to bottom or bottom to top depending on the column studied. In the drawing the width thus runs in the horizontal direction.

An incoming current collector 11 will be contacted to one or more working electrodes of the block. The incoming current collector will be in contact with one working electrode in the event the block includes a single monolithic electrochemical porous structure containing a working electrode, an insulating layer and a counter electrode, or in the event the block includes a single row of series-connected monolithic electrochemical porous structures containing a working electrode, an insulating layer and a counter electrode. In the event the block includes a plurality of monolithic electrochemical porous structures containing a working electrode, an insulating layer and a counter electrode connected in parallel, the incoming current collector 11 will be in contact with a plurality of working electrodes.

An outgoing current collector 13 will be contacted to one or more counter electrodes of the block. The outgoing current collector will be in contact with one counter electrode in the event the block includes a single monolithic electrochemical porous structure containing a working electrode, an insulating layer and a counter electrode, or in the event the block includes a single row of series-connected monolithic electrochemical porous structures containing a working electrode, an insulating layer and a counter electrode. In the event the block includes a plurality of monolithic electrochemical porous structures containing a working electrode, an insulating layer and a counter electrode connected in parallel, the outgoing current collector 11 will be in contact with a plurality of counter electrodes.

Conveniently the terminals $T_{ij}$ of two consecutive blocks in a column of series connected blocks can be located close to each other at an inner intersection area 23, which is provided at a location having a centre between the blocks in a quadruple of blocks $9_{11}$, $9_{12}$, $9_{21}$, $9_{22}$ formed by an upper left block, upper right block, lower left block and lower right block.

The column of blocks $9_{11}$, ... $9_{14}$; $9_{21}$, ... $9_{24}$; $9_{31}$, ... $9_{34}$; $9_{41}$, ... $9_{44}$; are separated by vertical passages $P_1$, $P_2$, $P_3$ having a width D allowing said set of conductors to be positioned between the blocks. Two consecutive blocks $9_{11}$, $9_{12}$ in a column of blocks are separated by horizontal passages H in which the incoming and outgoing current collector are positioned. At the horizontal and vertical passages each block is preferably sealed from the neighbouring blocks by an encapsulation layer such that electrolyte may not flow from one block to another. As will be shown later, in the event a block contains a plurality of cells, each cell may be sealed to prevent electrolyte to flow between the different cells in the block.

It is preferred to arrange the terminals $T_{ij}$ at the intersection between a vertical and horizontal passage. It is, however, possible to allow the ingoing current collector and outgoing current collector 11, 13 to extend into the vertical passage P, whereby the terminal $T_{ij}$ will be located in the vertical passage P. Likewise, it is possible to allow the conductor $21_{ij}$ to extend into the horizontal passage H, whereby the terminal $T_{ij}$ will be located in the horizontal passage H.

Since the incoming current collector 11, outgoing current collector 13 and conductors $21_{ij}$ of a block $9_{ij}$ serves to form a contact means 19 allowing individual disconnection of a block, the incoming current collector 11, outgoing current collector 13 and conductors $21_{ij}$ will be formed of a material having metallic conductivity. It is not necessary that the incoming current collector 11, outgoing current collector 13 and conductors $21_{ij}$ are positioned on a conducting intermediate layer, they may be placed directly on the substrate or under or above the counter electrode or in contact with the working electrode as have been exemplified in FIGS. 5-12. The incoming current collector 11, outgoing current collector 13 and conductors $21_{ij}$ of a block $9_{ij}$ are, however, always carried by and deposited on the substrate and internally located in the sealed electrochemical system. Here with deposited on is intended that it is deposited directly or indirectly on the substrate, that is directly on the substrate or on any material deposited on the substrate such as the intermediate layer or the working or counter electrode. The incoming current collector 11, outgoing current collector 13 and conductors $21_{ij}$ of a block $9_{ij}$ are thus not formed by external conductors which extend outside of the system and which hence are not carried and deposited on the substrate.

Still more preferably the terminals $T_{ij}$ of four consecutive blocks in a column of series-connected blocks are located close to each other at the inner intersection area 23 which is provided at a location having a centre between the blocks in a quadruple of blocks $9_{11}$, $9_{12}$, $9_{21}$, $9_{22}$ formed by an upper left block, upper right block, lower left block and lower right block.

This is achieved by arranging the conductors $21_{ij}$ on the right side for a first column of blocks, and on the left side for the next column of blocks. In this manner the conductors $21_{ij}$ of a first column are located in the first vertical passage as are the conductors $21_{i+1j}$ of the second column. The conductors $21_{ij}$ and $21_{i+1j}$ of two neighbouring columns are thus arranged in the same vertical passage.

For the first quadruple of blocks $9_{11}$, $9_{12}$, $9_{21}$, $9_{22}$, a first conductor $21_{11}$ extends between two neighbouring blocks $9_{11}$, $9_{21}$ from an incoming current collector 11 of the block $9_{11}$ towards an outgoing current collector 13 of the block $9_{11}$. In the same manner a second conductor $21_{21}$ extends between two neighbouring blocks $9_{11}$, $9_{21}$ from outgoing current collector 13 of the block $9_{21}$ toward an incoming current collector 11 of the block $9_{21}$. Furthermore, a third conductor $21_{12}$ extends between two neighbouring blocks $9_{12}$, $9_{22}$ from an outgoing current collector 13 of the block $9_{12}$ toward incoming current collector 13 of the block $9_{12}$. Finally, a fourth conductor $21_{22}$ extends between two neighbouring blocks $9_{12}$, $9_{22}$ from an incoming current collector 11 of the block $9_{22}$ toward an outgoing current collector 13 of the block $9_{22}$.

In this manner terminals $T_{12}$, ... $T_{22}$ for individually disconnecting each block $9_{11}$, $9_{12}$, $9_{21}$, $9_{22}$ are located at the inner intersection area 23.

For allowing a convenient access to all four terminals $T_{12}$, ... $T_{22}$ for individual disconnection of each block in a quadruple of blocks, the inner intersection area 23 where the terminals are arranged has a smaller radial extension than 2D, where D is the width of the vertical passage P. The width of a vertical passage is measured as the horizontal distance between the edges of counter electrodes of two neighbouring blocks in two neighbouring columns. The centre of the inner intersection area 23 is preferably located at the geometric centre of a crossing between a vertical and horizontal passage. The intersection area is a virtual area defining suitable close arrangement of the terminals of the blocks. The terminals are arranged in the vertical and/or horizontal passages between the blocks and besides the block, which it serves. Suitably the terminals are arranged in pairs or quadruples at the inner intersections areas having a radial extension of less than 4D, preferably less than 2D as indicated above. By arranging the terminals in pair or quadruples located close to each other, that is less than 4D or preferably less than 2D, from a geometrical centre of the intersection between vertical and horizontal passages.

Generally the inner intersection area 23 is formed at a location having a centre in the intersection between a vertical passage P and a horizontal passage H.

An inner intersection area is thus a location preferably in the vertical passages separating columns of blocks at the location approximately where the horizontal passages separating blocks in the columns of blocks crosses the vertical passages. As indicated above, it is possible to allow the incoming and outgoing current collectors to extend into the vertical passage and further a bit upwards and/or downwards in the vertical passage to allow the terminals $T_{ij}$ to be located at some distance from the crossing point between the horizontal and vertical passage. It is also possible to allow the conductor to extend a bit into a horizontal passage in order to locate the terminal $T_{ij}$ in the horizontal passage. In order to not reduce the surface efficiency, that is the area covered by cells divided by the total area of the substrate, it is preferred that the terminals are positioned in the vertical passage and beside the block which it serves, since space for more conductors is required in the event a terminal is not positioned beside the block which it serves.

Disconnection of block $9_{11}$ is thus made by connecting conductor $21_{11}$ with the outgoing current collector 13 of block $9_{11}$; disconnection of block $9_{12}$ is made by connecting conductor $21_{12}$ with the incoming current collector 11 of block $9_{12}$, disconnection of block $9_{21}$ is made by connecting conductor $21_{21}$ with incoming current collector 11 of block $9_{21}$; and disconnection of block $9_{22}$ is made by connecting conductor $21_{22}$ with outgoing current collector 13 of block $9_{22}$.

Access to the contact means 19 may be provided via openings in the substrate or, preferably, opening in the encapsulation. The holes are preferably present in the substrate or the encapsulation when forming the system but may also be formed either by penetration of the encapsulation after the system has been sealed, or by forming a cavity in the substrate after completion of the system. Preferably, the encapsulation material has openings at the location of the intersection areas. The openings should at least be so large that the terminals of the intersection area are accessible. The encapsulation material may consist of e.g. laminates. Such laminates typically consists of a at least one plastic material laminated together with a metal foil. The metal foil enables a better barrier to e.g. gases and moisture. In the case, the encapsulation consists of a laminate of a plastic material and a metal foil, it will not be possible to see through the encapsulation material. This means that from the back-side of the monolithic photo-electrochemical system, i.e. a top view from the encapsulation side, the monolithic photo-electrochemical system shown in FIG. 1, would have at least four openings, one for each intersection area. Additionally, the encapsulation also may have two openings for the first and second terminals 15 and 17. The encapsulation may also e.g. consist of a joint of a plastic material or glass-frit materials that are encapsulated between the substrate of the monolithic photo-electrochemical system and a second substrate in a pattern defined by where the encapsulation material is applied. Preferably, the encapsulation material is applied around each cell to avoid electrophoreses and/or unwanted contact between the electrolyte and the current collectors. This second substrate may consist of glass but other materials can also be used. In this case, openings are preferably made in the second substrate on top of the intersection areas to enable access to the terminals after encapsulation.

It is also possible to mount a diode at the terminals $T_{ij}$ before encapsulation of the system. Such a diode allows current to pass in the event the block should operate in negative bias. Also in this case, it is preferred to have openings in the encapsulation material or the second substrate to prevent the diodes from being damaged during encapsulation.

The monolithic electrochemical system 1 preferably includes a plurality of blocks $9_{ij}$ arranged in a matrix of size m×n, where m and n are integers of value equal or greater than three. When m and n are integers having a value equal or greater than three, at least one inner block exists, which block do not have one of its sides adjacent to the periphery of the matrix of blocks. Instead, an inner block will be circumvented by other blocks. By arranging the terminals at inner intersection areas 23 at least for inner blocks being circumvented by other blocks, instead of at the periphery of the matrix of blocks, it will be possible to reduce the number of conductors that has to be arranged in between the blocks and hence it will be possible to maintain a high surface efficiency while allowing each individual block to be disconnected.

Preferably, the matrix is of such a size that it includes an integer number of quadruples in both vertical and horizontal directions. Especially, when m×n, where m and n are integers of value equal or greater than four, the formation of contact means 19 internally on the matrix, i.e. when terminals are not formed at the periphery of the matrix, will reduce the number of conductors that must be arranged in horizontal or vertical passages in order to allow individual disconnection of the blocks. Hence it is preferred that the matrix comprises at least one inner block being surrounded by blocks without having contact with an edge of the matrix.

By forming an inner intersection area between the blocks in a quadruple of blocks formed by an upper left block, upper right block, lower left block and lower right block, and arranging contact means at said inner intersection area it is possible to effectively and independently disconnect each block via said contact means by engaging with said contact means essentially vertically through either the substrate or the encapsulation or by the location of a diode at one or several terminals $T_{ij}$ in said quadruple of blocks. It is especially beneficial when the matrix can be subdivided into a plurality of quadruples of blocks formed by an upper left block, upper right block, lower left block and lower right block, and that said contact means are arranged at an inner intersection area formed in an area where a horizontal passage between two blocks in the quadruple intersects a vertical passage between two blocks in the quadruple. In this manner four terminals for individually disconnecting each block in the quadruple will be within reach at a small area.

The important feature that is achieved by the invention is that each block can independently be contacted before and/or after encapsulation of the system, and in case of failure be disconnected before or after the matrix has been sealed. Another important feature is that diodes efficiently can be applied before or after encapsulation of the system enabling lower efficiency losses in an operating system caused by e.g. partial shading of the system and/or faster degradation of a certain part of the system leading to a part of the system operating at negative voltages and thus lowering the efficiency.

In relation to FIG. 1, it is important to mention that this is one possible solution for serial-connections of 16 blocks. The blocks may also be serial-connected in many other configurations. As an example, another possibility to obtain four intersection areas that each contain terminals for disconnecting four different blocks is to start at block $9_{12}$ and to serial-connect the blocks in the following order; $9_{12}$, $9_{11}$, $9_{21}$, $9_{22}$, $9_{32}$, $9_{31}$, $9_{41}$, $9_{42}$, $9_{43}$, $9_{44}$, $9_{34}$, $9_{33}$, $9_{23}$, $9_{24}$, $9_{14}$, and $9_{13}$. This means that the four quadruple of blocks that share intersection area will be block $9_{12}$, $9_{11}$, $9_{21}$, and $9_{22}$ for the first intersection area, block $9_{32}$, $9_{31}$, $9_{41}$, and $9_{42}$ for a second intersection area, block $9_{43}$, $9_{44}$, $9_{34}$, and $9_{33}$ for a third intersection area, and block $9_{23}$, $9_{24}$, $9_{14}$, and $9_{13}$ for a fourth intersection area. An advantage of this configuration is that the two terminals 15 and 17 can be placed close to each other in adjacent blocks. Clearly, this, or any other, configuration demands an adapted design of various parts of the system, such as the intermediate layer and the current collectors.

Figure 3:
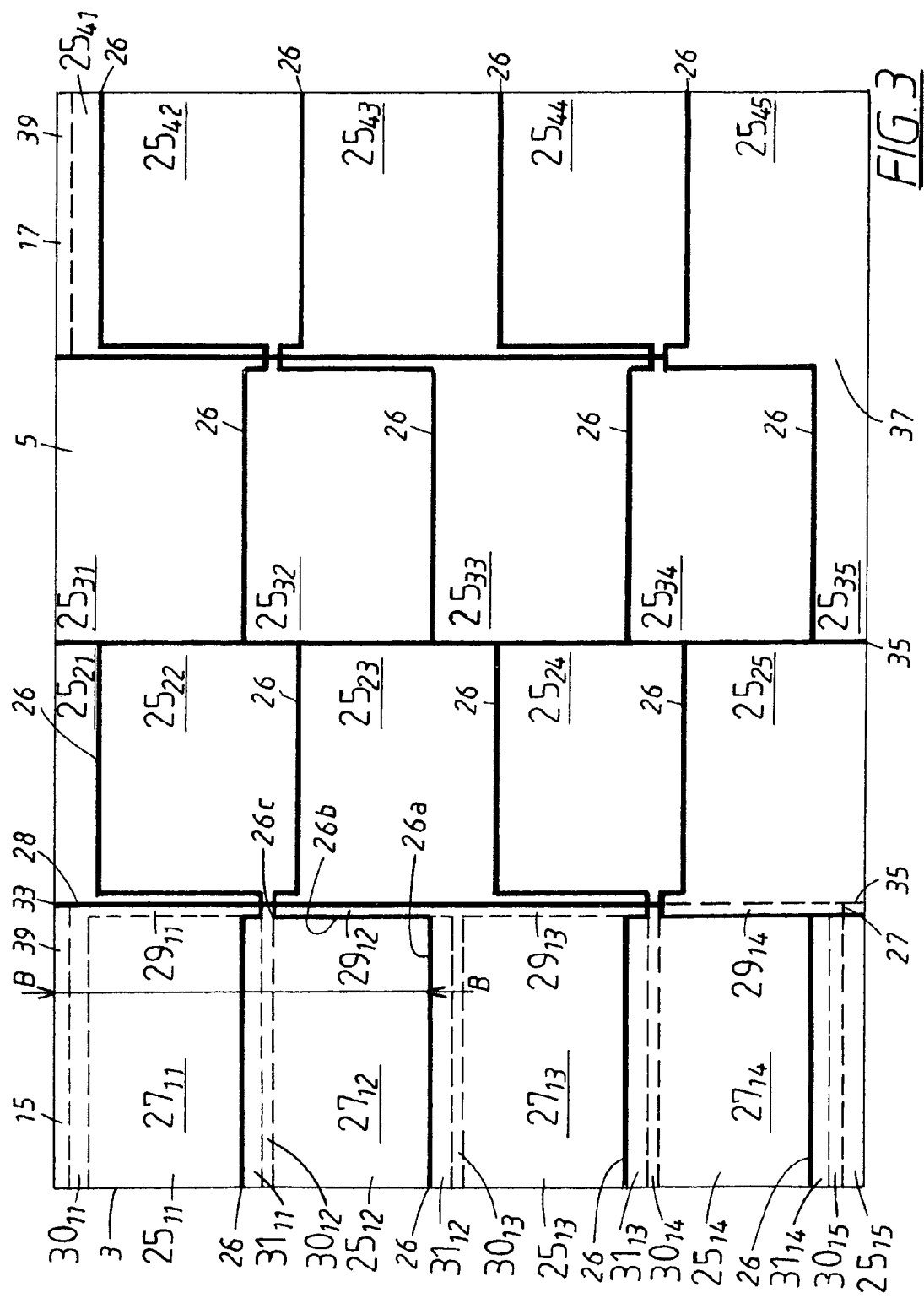
FIG. 3 is a schematic view of an intermediate layer for a matrix of 16 serial-connected blocks shown in FIG. 1, in the case where each block consists of one monolithic cell.

FIG. 3 is an example of a substrate 3 for a monolithic electrochemical system 1 consisting of 16 serial-connected blocks $9_{ij}$ as shown in FIG. 1. Suitable substrates are well known in the art and may preferably be made of glass or plastic material. In this example, each block consists of one porous structure, i.e. one monolithic photo-electrochemical cell. The substrate 3 carries an electrically conducting pattern 5 of an intermediate layer adhered to the substrate 3. The electrically conducting pattern 5 is structured into separate regions $25_{kl}$. All regions $25_{kl}$ in a column are isolated from each other by formation of division lines 26 separating the regions $25_{ij}$ in a column i from each other. For regions $25_{ij}$ where a conductor $21_{ij}$ of a block $9_{ij}$ is connected to an incoming current collector 11, the division line may be formed as a straight horizontal line 26. For such a block, the conductor $21_{ij}$ of a block $9_{ij}$ will be connected at one end to the incoming current collector 11 of the block, which extends in a horizontal direction along the width of the block. The conductor $21_{ij}$ extends down toward the horizontal line 26 separating the regions $25_{ij}$ from the region $25_{ij+1}$. The conductor $21_{ij}$ will however not pass the division line. In stead a terminal $T_{ij}$ is formed at the horizontal line, where, if the terminal is closed, the block connected thereto will be short-circuited. For regions $25_{ij}$ where a conductor $21_{ij}$ of a block $9_{ij}$ is connected to an outgoing current collector, the division line 26 will have a more complex form. This is so because the conductor $21_{ij}$ need to pass beside a neighbouring region, $25_{ij+1}$ or regions $25_{ij-1}$, depending on whether the series connection of the block will run in the downwards direction or in the upwards direction. In the example shown in FIG. 3 an extended portion of region $25_{13}$, that is the contact path $29_{12}$, is arranged to support a conductor $21_{12}$ will lead upwards towards a contact path $30_{12}$ arranged to support an incoming current collector 11 of block $9_{12}$. A passage between the contact path $30_{12}$ of the neighbouring region $25_{12}$ will however remain. The division line 26 will thus, for the type of region $25_{ij}$ where a conductor $21_{ij}$ of a block $9_{ij}$ is connected to an outgoing current collector of the block $9_{ij}$, include a horizontal portion $26_a$ running below the carrier area, a vertical portion $26_b$ running up towards a contact path $30_{12}$ arranged to carry in incoming current collector of the block, and a second horizontal portion $26_c$ extending along the contact path out to a vertical division line 28.

Since the conductors $21_{ij}$ should have metallic conductivity it is not necessary to provide the regions $25_{ij}$ with contact paths $29_{ij}$ since the conductors may be positioned directly on the substrate 3. Since the incoming and outgoing current collector 11, 13 should have metallic conductivity, it is not necessary to provide the regions $25_{ij}$ with contact paths $30_{ij}$. Various possible positions of the incoming and outgoing current collectors relative to the counter electrode, working electrode, conducting layer and substrate are shown in FIGS. 5-12.

The first or last region in a column may be connected to the first region or last region in the next column, when a block located in a column should be connected in series with a block in the next column. For this purpose vertical division lines 28 alternately extends from the top 33 of the electrically conducting pattern towards the bottom of the electrically conducting pattern separating the regions $25_{kl}$ into separate columns except for the last region in the row, which may extend over two columns or extends from the bottom 35 of the electrically conducting pattern towards the top of the electrically conducting pattern separating the regions $25_{kl}$ into separate column except for the uppermost region in the column, which may extend over two columns Alternately, the top and bottom region may have a connection 37 which connects two columns. The inclusion of a connection 37 is shown in the connection between the third and the fourth column where the regions $25_{35}$ and $25_{45}$ are not separated but forms a single uninterrupted surface connected via a connection 37. Since the bridge between two columns includes a metallic conductor, it is not necessary to include the connection 37 between the two connected regions in two neighbouring columns. The vertical division line 28 may thus extend such it divides also the bottom or top region at locations where two blocks in neighbouring columns should be connected in series. The absence of a connection 37 is shown in the connection between the first and second column where the regions $25_{15}$ and $25_{25}$ are separated at the bottom 35 by the vertical division line 28. Connection between the regions $25_{15}$ and $25_{25}$ will be made by a metallic conductor which forms an outgoing current collector 13 (not shown in FIG. 3) of block $9_{14}$ and an incoming current collector 11 (not shown in FIG. 3) of block $9_{24}$. The absence of a connection 37 is furthermore shown in the in the connection between the second and third column where the regions $25_{21}$ and $25_{31}$ are separated at the top 33 by the vertical division line 28. Connection between the regions $25_{21}$ and $25_{31}$ will be made by a metallic conductor which forms an outgoing current collector 13 (not shown in FIG. 3) of block $9_{21}$ and an incoming current collector 11 (not shown in FIG. 3) of block $9_{31}$. A person skilled in the art may select whether to include the connections 37 such that regions $25_{ij}$ and $25_{i+1j}$ in neighbouring columns where blocks of two neighbouring columns should be connected in series are not separated but forms a single uninterrupted surface connected via a connection 37 or whether such connections should not be included. As shown in the example, it is possible to include connections for certain columns and not for other columns. The regions $25_{kl}$ may be formed by selectively removing the intermediate layer by e.g. laser-structuring or chemical etching according to conventional methods, or by selectively applying the intermediate layer via e.g. screen-printing.

A column of regions $25_{kl}$ includes a first region $25_{k1}$ and a last region $25_{kN}$, where N is the number of regions in a column. All regions except the first and last regions includes a portion forming a carrier area $27_{kl}$ arranged to support a working electrode of a block $9_{kl}$, a contact path $30_{kl}$ arranged to support an incoming current collector 11 of block $9_{kl}$, and an outgoing current collector 13 of block $9_{kl-1}$ or $9_{kl+1}$, depending on whether the series connection is arranged from top to bottom, as in odd columns, or whether the series connection is arranged from bottom to top, as in even columns, and contact portions $31_{ij-1}$ or $9_{kl+1}$, depending in whether the series connection is arranged from top to bottom, as in odd columns, or whether the series connection is arranged from bottom to top, as in even columns. arranged to be in contact with a counter electrode of a block. A contact path $29_{ij}$ arranged to support the conductor $21_{ii}$ of a block $9_{ij}$ is present for each block $9_{ij}$. The contact paths are however not distributed such that every region includes a contact path. The region $25_{kl}$ including a carrier area $27_{kj}$ of block $9_{kj}$ where the conductor $21_{kj}$ is connected to the outgoing current collector of the block and which block is not situated at the bottom or top of a column, will include a contact path $29_{kj}$ for the block $9_{kj}$ as well as the contact path $29_{kj-1}$ or $29_{kj+1}$ depending on whether on whether the series connection is arranged from top to bottom, as in odd columns, or whether the series connection is arranged from bottom to top, as in even columns. The first region $25_{k1}$ and a last region $25_{kN}$ will each include a contact path $29_{kj}$, while the region $25_{kl}$ including a carrier area $27_{kj}$ of block $9_{kj}$ where the conductor $21_{kj}$ is connected to the incoming current collector of the block and which block is not situated at the bottom or top of a column, will not include a contact path $29_{kj}$ In the example disclosed in FIG. 3, the region $25_{11}$ includes a single contact path $29_{11}$; the region $25_{12}$ does not include a contact path; the region $25_{13}$ includes two contact paths $29_{12}$ and $29_{13}$; the region $25_{14}$ does not include a contact path; the region $25_{15}$ includes a single contact path $29_{15}$. In the next column the region $25_{21}$ includes a single contact path $29_{11}$; the region $25_{22}$ does not include a contact path; the region $25_{23}$ includes two contact paths $29_{22}$ and $29_{23}$; the region $25_{24}$ does not include a contact path; the region $25_{25}$ includes a single contact path $29_{25}$. The following columns are arranged in the same manner.

The first region $25_{k1}$ for columns having an odd number will includes a carrier area $27_{k1}$, but not a contact portion $31_{ij}$. The last region $25_{kN}$ for columns having an odd number will include a contact portions $31_{kN}$, but not a carrier area $27_{ij}$. The first region $25_{k1}$ for columns having an even number will includes a contact portions $31_{k1}$, but not a carrier area $27_{ij}$. The last region $25_{kN}$ for columns having an even number will includes a carrier area $27_{kN}$, but not a contact portions $31_{ij}$.

Hence it may be observed that a column consisting of N regions will carry N-1 blocks $9_{ij}$.

The first region $25_{11}$ in the first column includes a conductive area 39, which leads to a first terminal 15 of the electrochemical system. The region which is intended to carry the contact portion of the last block in the matrix of series connected blocks, that is the first or last region in the last column of regions depending on the number of columns, includes a conductive area 39 which leads to a second terminal 17 of the electrochemical system.

Figure 4:
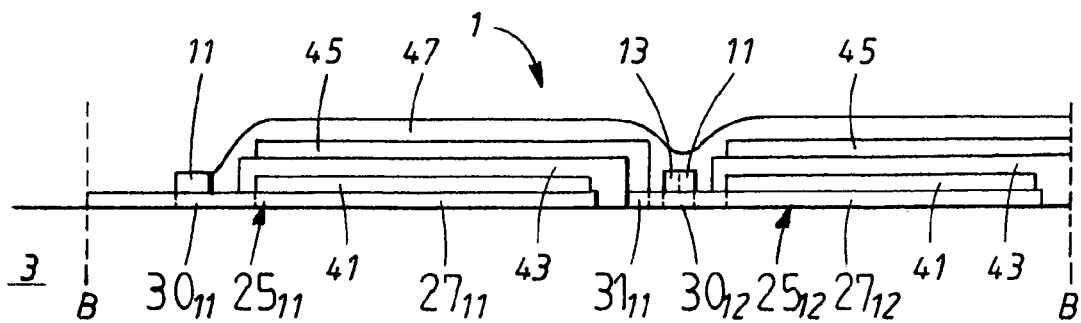
FIG. 4 shows a cross section of a configuration of an electrochemical system, which carries blocks including a single monolithic porous structure arranged on a substrate with an intermediate layer.
Figure 5:
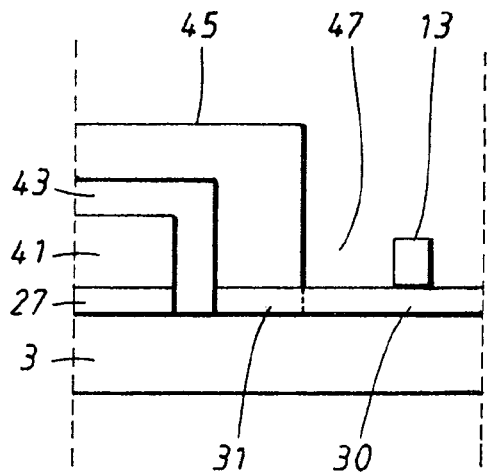
FIG. 5 shows a configuration to realise the electrical connection between a counter electrode and a current collector of a counter electrode.
Figure 6:
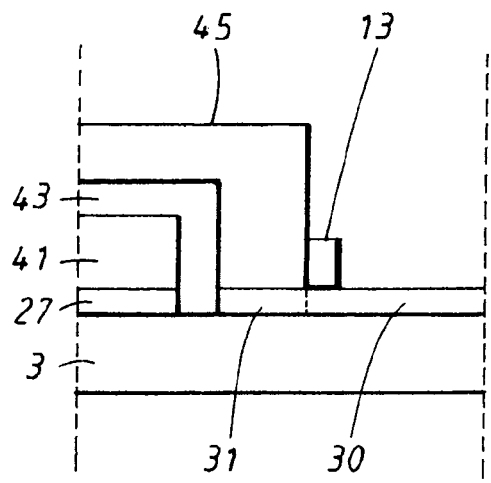
FIG. 6 shows a second configuration to realise the electrical connection between a counter electrode and a current collector of a counter electrode.

Here in this example, the separation between the portion forming a carrier area $27_{ij}$ arranged to support a working electrode of a block $9_{ij}$, the contact path $30_{ij}$ arranged to support an incoming current collector 11 of block $9_{ij}$ and the outgoing current collector 13 of a neighbouring block, if present, and contact portions of a neighbouring block arranged to be in contact with a counter electrode of a block $9_{ij}$ are purely virtual, since these areas form part of a single uninterrupted area formed in the intermediate layer. This also applies to the contact paths, in the event one or two contact paths of are present in the region $25_{ij}$ in the manner as have been disclosed above. FIG. 4 shows a cross section of a configuration of an electrochemical system 1 which carries blocks including a single monolithic porous structure, i.e. a single monolithic photo-electrochemical cell, arranged on a substrate with an intermediate layer. The cross section is taken through line B-B shown in FIG. 3 at the first two regions $25_{11}$ and $25_{12}$. In the embodiment shown in FIG. 4 each block $9_{11}$ and $9_{12}$ thus includes a single porous structure. Each block thereby includes a single working electrode 41 arranged on top of the respective carrier area $27_{11}$ and $27_{12}$. an insulation layer 43 is covering the working electrode 41 and separating the working electrode 41 from a counter electrode 45 positioned on top of and covering at least part of the insulation layer 43. The counter electrode 45 extends down to a contact portion $31_{11}$ An incoming current collector 11 of the first block $9_{11}$ is located on the contact path $30_{11}$ and a conductor forming an outgoing current collector of the first block $9_{11}$ and an incoming current collector 13 of the second block $9_{12}$ is located on a contact path $30_{12}$.

An early example of the configuration of a single monolithic photo-electrochemical cell, i.e. the porous structure of working electrode, insulating layer, and the counter electrode is disclosed in WO97/16838. More recent examples of monolithic photo-electrochemical systems are disclosed in WO 2004/038745 A3, and JP 2007 194039. All of the configurations mentioned in these documents are included in this application and could be used as the porous structures.

The cells in the example of an electrochemical system shown in FIG. 4 is encapsulated by a sealing material 47, which encapsulates an electrolyte within respective cell.

Figure 7:
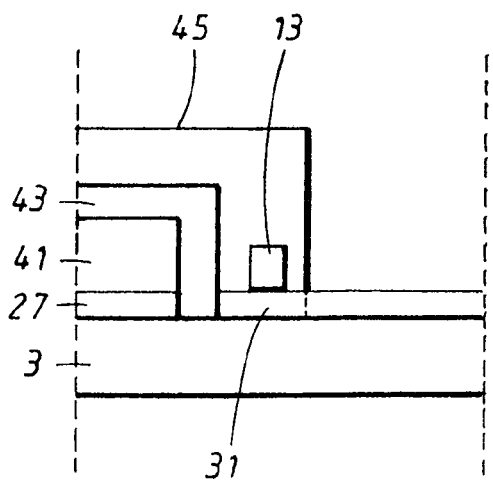
FIG. 7 shows a third configuration to realise the electrical connection between a counter electrode and a current collector of a counter electrode.
Figure 8:
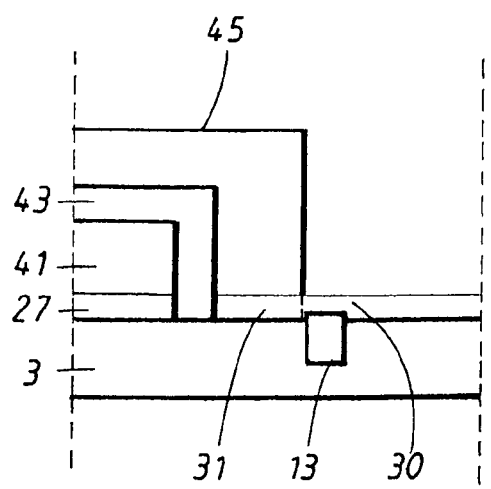
FIG. 8 shows a fourth configuration to realise the electrical connection between a counter electrode and a current collector of a counter electrode.

Examples of various configurations to realize the electrical connection between the counter electrode and the current collectors of the counter electrode are shown in FIGS. 5-8. In one example shown in FIG. 5, the outgoing current collector 13, that is the current collector of the counter electrode 45, is placed at a certain distance from the edge of counter electrode 45. This configuration is preferred when the current-collecting conductors are not chemically compatible with the electrolyte, and/or when an encapsulation barrier 47 preventing the electrolyte from making connections between adjacent serial-connected blocks should be obtained. Such an encapsulation may be realized with e.g. plastic materials, so-called glass-frits or any other suitable encapsulation materials. In a second example shown in FIG. 6, the current collector 13 of the counter electrode 47 is in contact with the counter electrode 45. This configuration is possible when the current collector is chemically compatible with the electrolyte. This means that the current collector material is chemically compatible to the electrolyte that at least partly fills the porous structures of the photo-electrochemical system. In this manner the conductors can be exposed to the electrolyte without risk of degradation of the cell. A non-chemical compatibility between the electrolyte and the conductors will, on the other hand, lead to degradation of the device performance over time and decrease the life length. A conventional electrolyte in a photo-electrochemical cell contains the redox couple iodide/tri-iodide, often dissolved in an organic solvent. However other redox-couple and electrolyte variations are possible to use and thus included. Current collector materials that are chemically compatible with the typical iodide/tri-iodide containing electrolytes are e.g. titanium and nickel. However, all other combinations of electrolytes and conductors that are chemically compatible with each other are included. In a third example, the current collector 13 of the counter electrode 45 is placed at least partly under the counter electrode 47 as shown in FIG. 7. This configuration also requires a current collector material that is chemically compatible with the electrolyte. The advantage of this configuration is less surface losses caused by the current collectors. In a fourth example shown in FIG. 8, the current collector 13 of the counter electrode 45 is placed under the contact portion 31 and/or the conducting path 30 of the intermediate layer 25. In this case, the current collector 13 of the counter electrode 45 is preferably placed as close to the counter electrode 47 as possible. It is even possible to locate the current collector 13 of the counter electrode 45 under the contact portion 31.

Various configurations to realize the electrical connection between the working electrode and the incoming current collector 11, that is the current collector of the working electrode 41 are possible. In one example shown in FIG. 9, the ingoing current collector 11 of the working electrode 41 is placed at a certain distance from the working electrode 41. This configuration is preferred when the current collector material is not chemically compatible with the electrolyte solution, and/or when an encapsulation barrier 47 preventing the electrolyte from making connections between adjacent serial-connected blocks should be obtained. In a second example shown in FIG. 10, the current collector 11 of the working electrode is in contact with the working electrode 41 and/or the insulating layer 43. This configuration is possible when the current collector material is chemical compatible with the electrolyte. In a third example, the current collector 11 of the working electrode 41 is placed under the intermediate layer 25, preferably under the conducting paths 30, as shown in FIG. 11. In this case, the current collectors are preferably placed as close to the working electrode as possible.

In practice, the current collector of the counter electrode of a block and the current collector of the incoming current collector of the working electrode of the next block will in most cases be one in the same. The configuration may then be as the one shown in FIG. 12, where the common current collector 11, 13 of the outgoing counter electrode of one block and the incoming working electrode of the next block is placed in between the blocks with a certain distance to the electrodes. The current collectors may be made from silver or any other highly conducting material. This gives room for encapsulation 47 between the serial-connected blocks preventing the electrolyte from making contacts between cells in adjacent serial-connected blocks. In the case where the current collector material is chemically compatible to the electrolyte, the common current collector of the outgoing counter electrode of one block and the incoming working electrode of the next block may be placed in contact with the working electrode and/or the counter electrode. In fact, all other possible configurations shown in FIG. 5-11 or any combinations of the examples shown in FIGS. 5-11 can also be used.

In all examples in FIGS. 5-12, the current collectors of highly conducting material consist of straight conductor paths placed parallel to the widths of the working electrode and the counter electrode. However, the current collecting conductors may also include e.g. a set of branches to improve the current collection from one or several cells in the block. These branches may e.g. run perpendicular from a current collector of the working electrode in the direction towards the current collector of the counter electrode to improve the current collection of one or several working electrodes in a block, and/or perpendicular from a current collector of the counter electrode in the direction towards the current collector of the working electrode to improve the current collection of one or several counter electrodes in a block.

Figure 13:
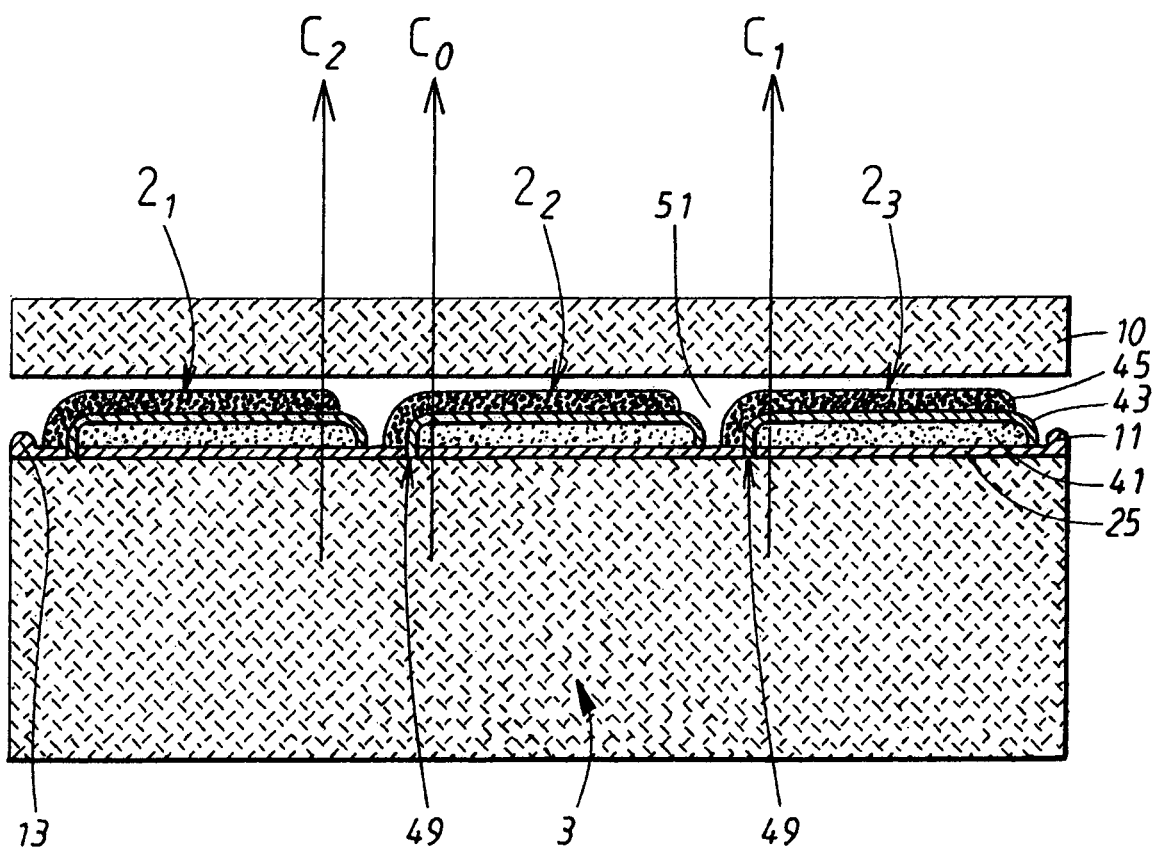
FIG. 13 shows a block including a number of monolithic cells connected in series.

In FIG. 13, a block including a number of monolithic photo-electrochemical cells $2_1$, $2_2$, $2_3$ connected in series is shown in a schematic cross section. Each cell $2_1$, $2_2$, $2_3$ constitutes a porous structure and comprises a working electrode or photo-electrode 41, an insulating layer 43 and a counter electrode 45. The cells $2_1$, $2_2$, $2_3$ or the porous structures are applied to an intermediate conducting layer 25 arranged on a substrate 3 in an electrically conducting pattern 5.

Examples of the serial-connected cells in a block of such a system are described in WO 97/16838 and WO 01/97237, the descriptions of which are incorporated in its entirety in this description.

The monolithic block comprises working electrodes 41 in the form of nanoporous photo-electrodes constructed on a substrate. The substrate comprises an electrically conducting pattern 5 of an intermediate layer 25 of a conducting transparent material. The substrate 3 can be made of glass or plastic. The intermediate layer can be e.g. F-doped $SnO_2$ or ITO, but all suitable materials are included. Each working electrode 41 is positioned on the intermediate layer 25. The intermediate layer 25 is divided into a pattern of thin dividing lines 49 where the intermediate layer 25 has been removed, or selectively applied. Thus a pattern designed to carry a set of three serial-connected cells $2_1$, $2_2$, and $2_3$ is formed. The pattern preferably consists of a set of elongate rectangles, but can of course be designed in an arbitrary manner, although preferably in a pattern allowing high surface efficiency.

The working electrode 41 is covered by a porous ply of an insulating layer 43, which insulates the working electrode 41 from the porous counter electrode 45, which is located on the insulating layer 43. The insulating layer 43 can preferably also constitute a diffuse reflector, which reflects light that has passed through the working electrode 41 without being absorbed in it, the degree of absorption of the system being increased.

In a preferred embodiment, the counter electrode 45 is applied in such a manner that it essentially covers the insulating layer 43 and extends up to the intermediate layer on an adjacent cell not covered by insulating layer 41. In this manner, series-connected cells are created, as the counter electrode of one cell is electrically connected to the working electrode of the next cell. An incoming current collector 11 and the outgoing current collector 13 are provided at respective end of the block.

It is important that the electrolyte in is prevented from making bridges between adjacent cells, so-called electrophoresis, as this may decrease the performance and life length of the cells, and may lead to unwanted performance differences between adjacent cells. One possibility to do it is to use electrolytes that cannot diffuse, e.g. so-called hole-conductors or very viscous electrolytes. However, conventionally, the electrolyte is rather liquid and can thus move between adjacent cells. In this case, it is preferred to separate adjacent cells by an interspace 51. The interspace 51 can be filled with an insulating material that prevents the electrolyte from leaking out from the porous structures and crating unwanted contact between electrodes in different cells. In a preferred embodiment, this insulating material consists of parts of the sealing material 47, which is pressed into the interspace 51.

Figures 14, 15:
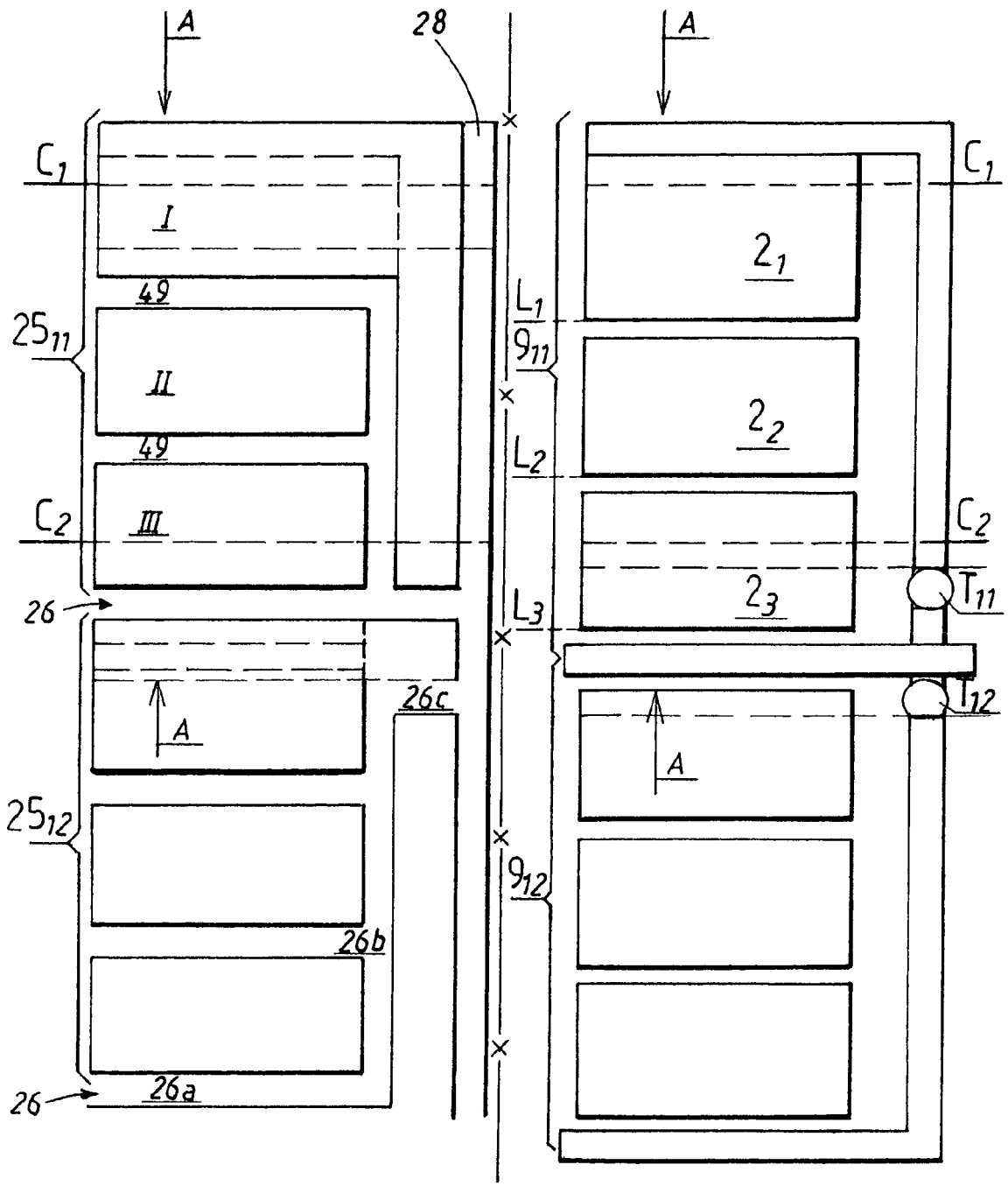
FIG. 14 shows a suitable intermediate layer for the block shown in FIG. 13.
FIG. 15 shows a first and a second block arranged on the intermediate layer shown in FIG. 14.

An example of a suitable pattern of the intermediate layer 25 of the serial-connected cells shown in FIG. 13 is shown in FIG. 14, which shows two consecutive regions $25_{11}$ and $25_{12}$ seen from above. Each consecutive region $25_{11}$ and $25_{12}$ is designed to support three serial-connected monolithic cells. The intermediate layer will include regions $25_{ij}$ having essentially the same shape as the regions for blocks including a single monolithic cell as shown in FIG. 3. The carrier area $27_{ij}$ will, however, be split into a plurality of isolated regions. In the example show in FIG. 14, each block $9_{ij}$ will include three cells connected in series as shown in FIG. 13. For this purpose the area corresponding to the carrier area $27_{ij}$ will be split into three parts. A first part I, which is connected to the contact path $30_{ij}$ of block $9_{ij}$. A second and a third part, II and III, which are positioned below the first part I and which are isolated from each other. The first part includes the carrier area of the first cell, the second part includes the contact portion of the first cell and the carrier area of the second cell, and the third part includes the contact portion of the second cell and the carrier area of the third cell. The contact portion of the third cell will be located in the neighboring region, as is the case for a block including a single cell.

FIG. 15 shows a top view of a first and second block $9_{11}$ and $9_{12}$ arranged on the regions $25_{11}$ and $25_{12}$ shown in FIG. 14. Here the lines $L_1, L_2, L_3$ show that the lower edges of the cells $2_1, 2_2$ and $2_3$, which is where the counter electrode extends down to the contact portions, are positioned such that the lower edge of the cell $2_1$ will be in electrical contact with the contact portion positioned on the second part II, the lower of the cell $2_2$ will be in electrical contact with the contact portion positioned on the third part III and the lower edge of the cell $2_3$ will be in electrical contact with the contact portion positioned on neighboring region. If a cross section through the block at the position A-A is made it should be noted that the structure above the line $C_1$, which may extend all the way down to where the insulation layer will start to descend toward the dividing line 49, is identical to a block including a single monolithic cell. Likewise, it should be noted that the structure below the line $C_2$, which may extend all the way up to where the insulation layer will start to descend toward the dividing line 49 or where the counter electrode ends, is identical to a block including a single cell. Also in FIG. 13, the lines $C_1$ and $C_2$ from where the structure of the block may be identical regardless of whether a single cell or a plurality of series connected elements are present in the block are indicated.

Figure 9:
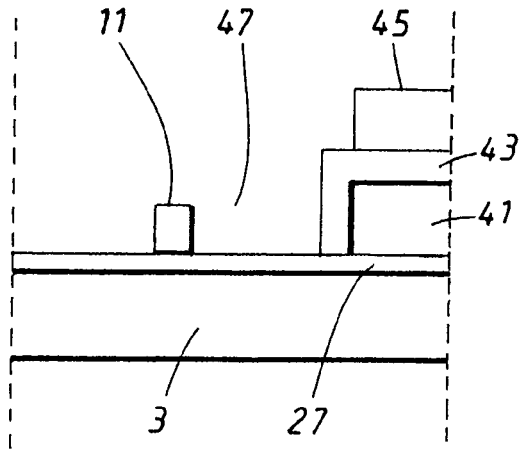
FIG. 9 shows a configuration to realise the electrical connection between a working electrode and a current collector of a working electrode.
Figure 10:
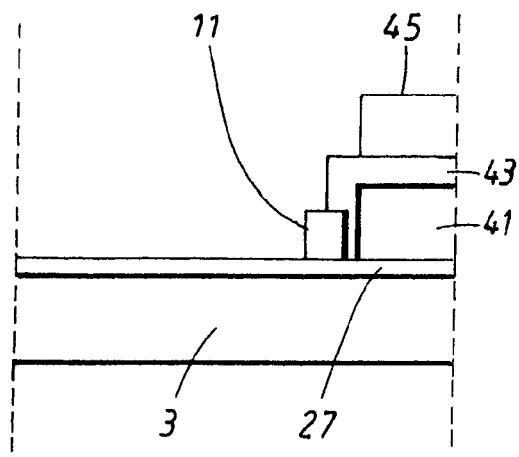
FIG. 10 shows a second configuration to realise the electrical connection between a working electrode and a current collector of a working electrode.
Figure 11:
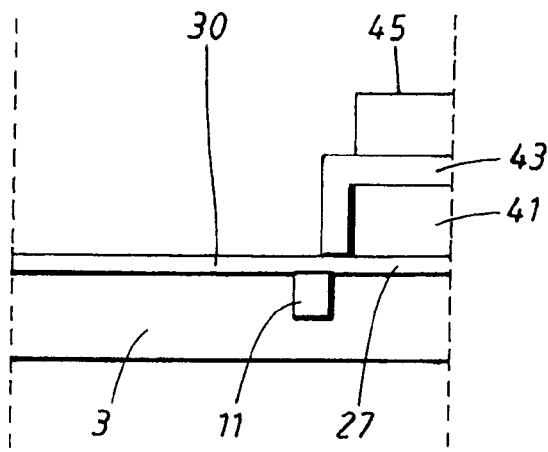
FIG. 11 shows a third configuration to realise the electrical connection between a working electrode and a current collector of a working electrode.
Figure 12:
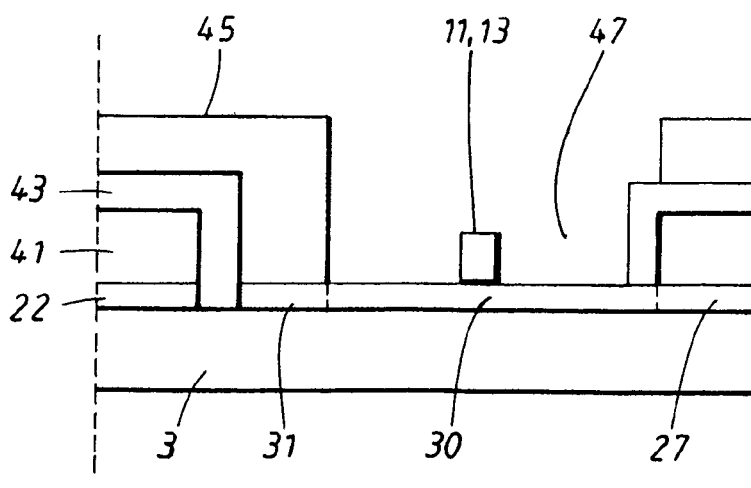
FIG. 12 shows a configuration to realise the electrical connection between a working electrode, a current collector and a common current collector for the working and counter electrode.

This means that a block consisting of serial-connected cells may be created by connecting any one of the structures shown in FIGS. 9-11 with a structure as shown in FIG. 5-8. In fact, all possible configurations shown in FIG. 5-12 or any combinations of the examples shown in FIGS. 5-11 can be used.

If a plurality of series-connected cells are to be arranged in a block, the inclusion of a repetition of an integer number of the structure between the lines $C_1$ and $C_0$ between the structures as shown in FIGS. 9-11 and a structure as shown in FIG. 5-8 will generate a block containing a plurality of cells arranged in series.

In the event a block includes a plurality of cells connected in series, each block includes an incoming current collector connected to the working electrode of the first cell, which will be nominated as an incoming current collector 11, and an outgoing current collector, which is connected to the counter electrode of the last cell of the cells connected in series in the block, which will be nominated as an outgoing current collector 13. In the event when more than one porous structure is included in the block, it is, as in the one-cell solution, preferred to connect the blocks via metallic strips forming an incoming current connector 11 and an outgoing current connector 13 of the blocks that are to be connected in series.

In the event the blocks in a column are connected in series in the manner shown in FIG. 4, the inner intersection area is formed in the intersection between a vertical passage P and a horizontal passage H between two consecutive carrier areas in a column.

Figure 16:
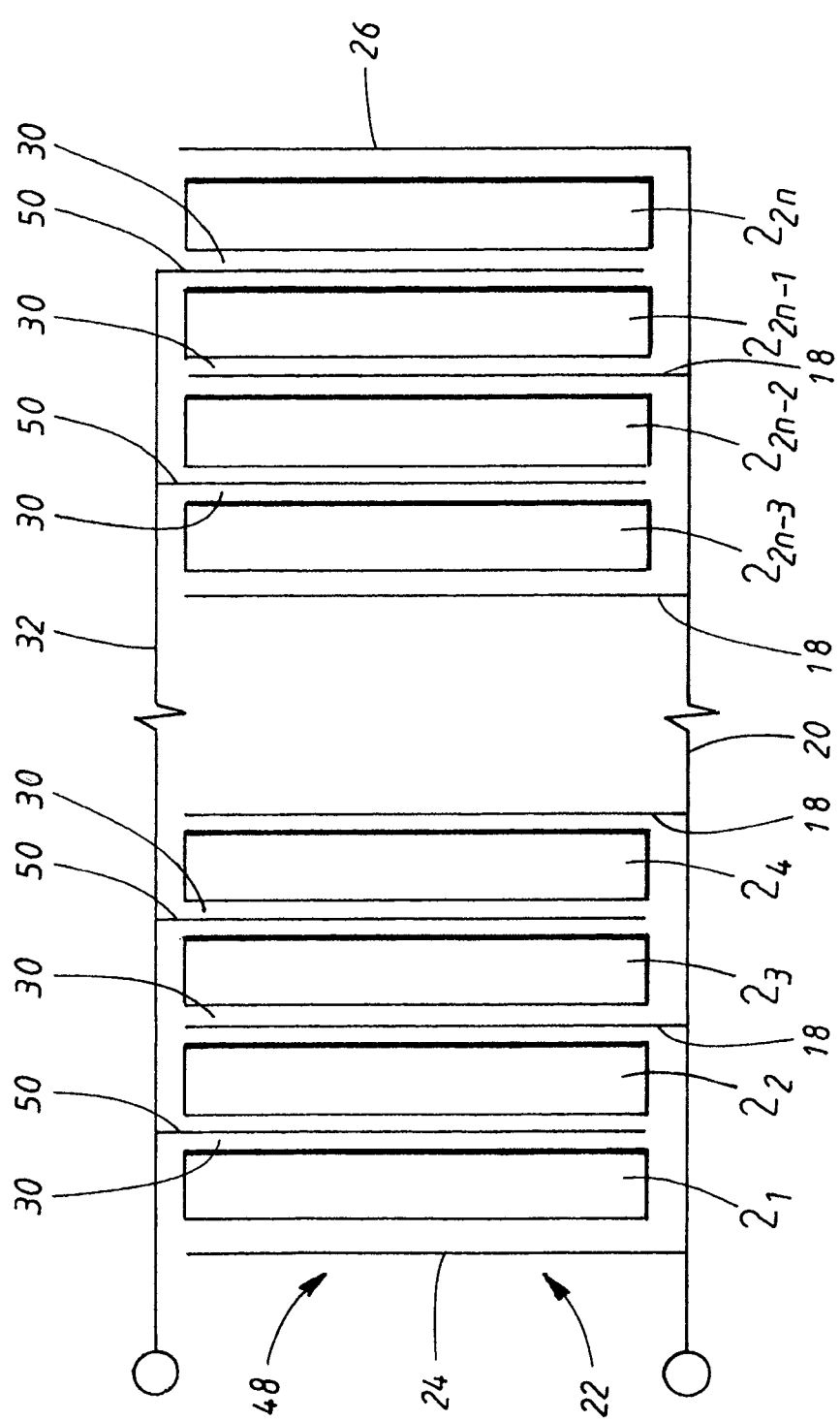
FIG. 16 shows a block consisting of parallel-connected monolithic cells.

The parallel connection of monolithic photo-electrochemical cells is in a block is illustrated in FIG. 16. In this example, a block including a plurality of monolithic cells arranged in parallel in a row 48 of elongated cells $2_1 \ldots 2_{2n}$ is shown. In this embodiment the incoming and outgoing current collectors 11, 13 includes:
 a first base 20 which extends along said row 48 and a first set of extensions 22 connected to said first base 20; said first set of extensions 22 is including a first extension 24 extending before and alongside the first cell $2_1$ in the row 48, a last extension 26 extending after and alongside the last cell $2_{2n}$ in said row 48 and a first set of intermediate extensions 18 extending into every other gap 30 between the cells starting with the second gap such that said first base 20 and first set of extensions 22 forms comb shaped pattern (Ш);
 and a second base 32 which extends along said row, said first and second bases 20, 32 being positioned on opposite sides of the row 48, and a second set of intermediate extensions 50 connected to said second base 32 and extending into every other gap between the cells starting with the first gap such that said second base and second set of extensions forms comb shaped pattern (П).

Each intermediate extension 18, 50 is electrically connected to both adjacent cells. The first base and first set of extensions form part of one of the incoming or outgoing current collector, while the second base and second set of extensions form part of the other. That is, according to one embodiment the first base 20 and its extensions forms the incoming current collector connected to the working electrodes of the cells, while the second base 32 and its extensions forms the outgoing current collector connected to the counter electrodes of the cells arranged in parallel. In another alternative embodiment, the first base 20 and its extensions forms the outgoing current collector connected to the counter electrodes of the cells connected in parallel, while the second base 32 and its extensions forms the incoming current collector connected to the working electrodes.

The row of photo-electrochemical cells is thus arranged so that all the cells included in the row are connected to the incoming and outgoing current collectors in parallel.

All the individual cells in the row are elongated, preferably rectangular, in shape and are positioned side by side with the longer sides facing each other. The width of the cells is restricted since the energy losses during the electron transport occur in the ohmic sheet resistance of the intermediate layer, which carries the working electrode, and in the ohmic sheet resistance of the counter electrode. The carrier areas and the contact portions of the cells are therefore connected to terminals via the conductors that extend into the gaps between the electrodes. As the length of the cells grows, the dimension of the extensions 18, 50 must grow in order to keep the losses low. The width of the necessary gap between the cells thus grows with an increased length of the cells. In order to provide maximum possible active area on a substrate it has been shown that the appropriate dimension of the cells is 5-10 mm width and 30-200 mm length.

In this example, a row of eight parallel-connected cells thus forms a block. The blocks are connected in series, i.e. the incoming working electrode of one block is connected to the outgoing counter electrode of the preceding block.

Suitable configurations of a block with cells arranged in parallel are disclosed in EP 1840916, which is incorporated in its entirety into this description.

Figure 17:
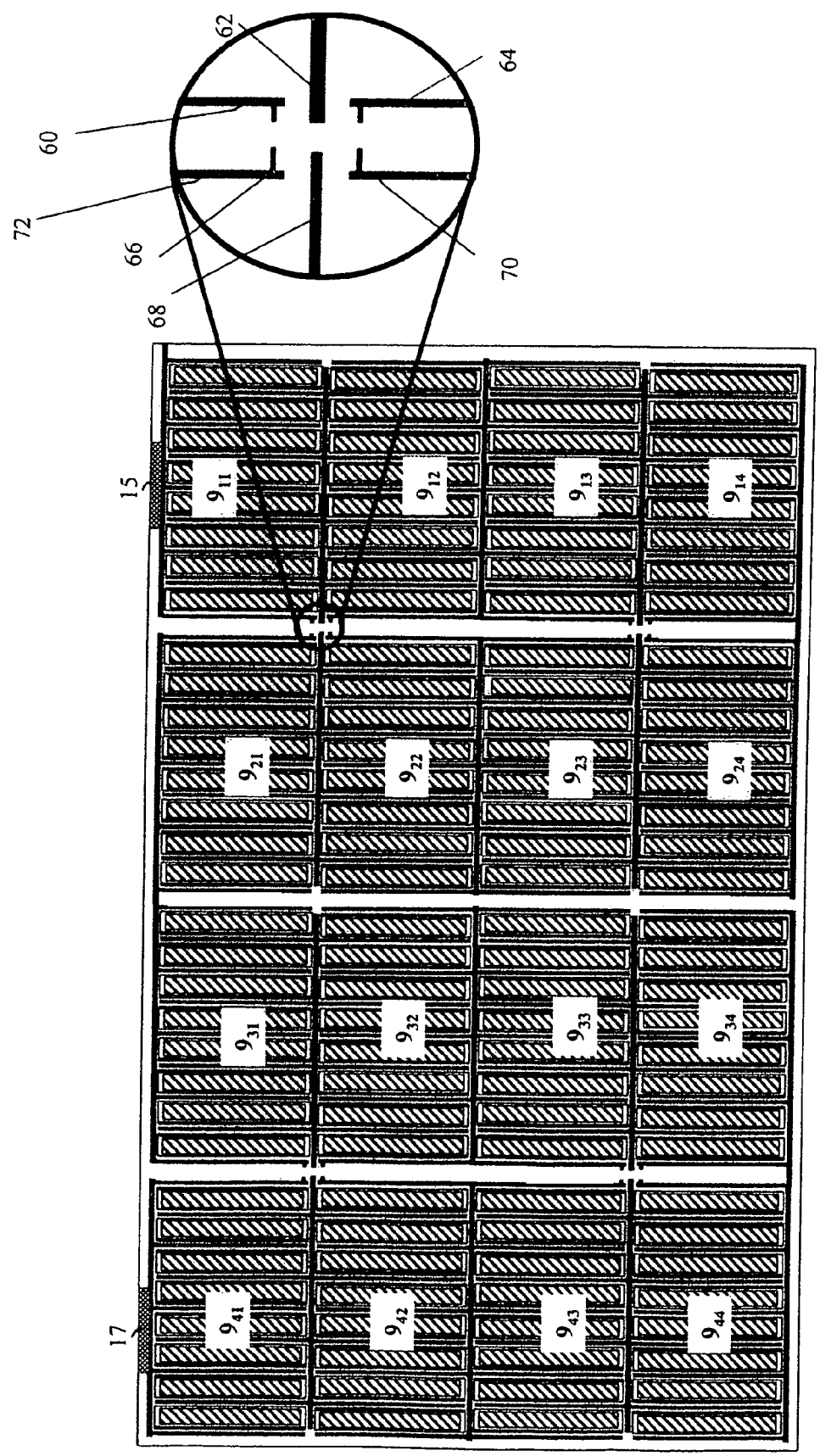
FIG. 17 is a schematic view seen through the substrate of a matrix of 16 serial-connected blocks comprising 8 parallel-connected cells where each block can be disconnected by contacting the inner contact points.
Figure 18:
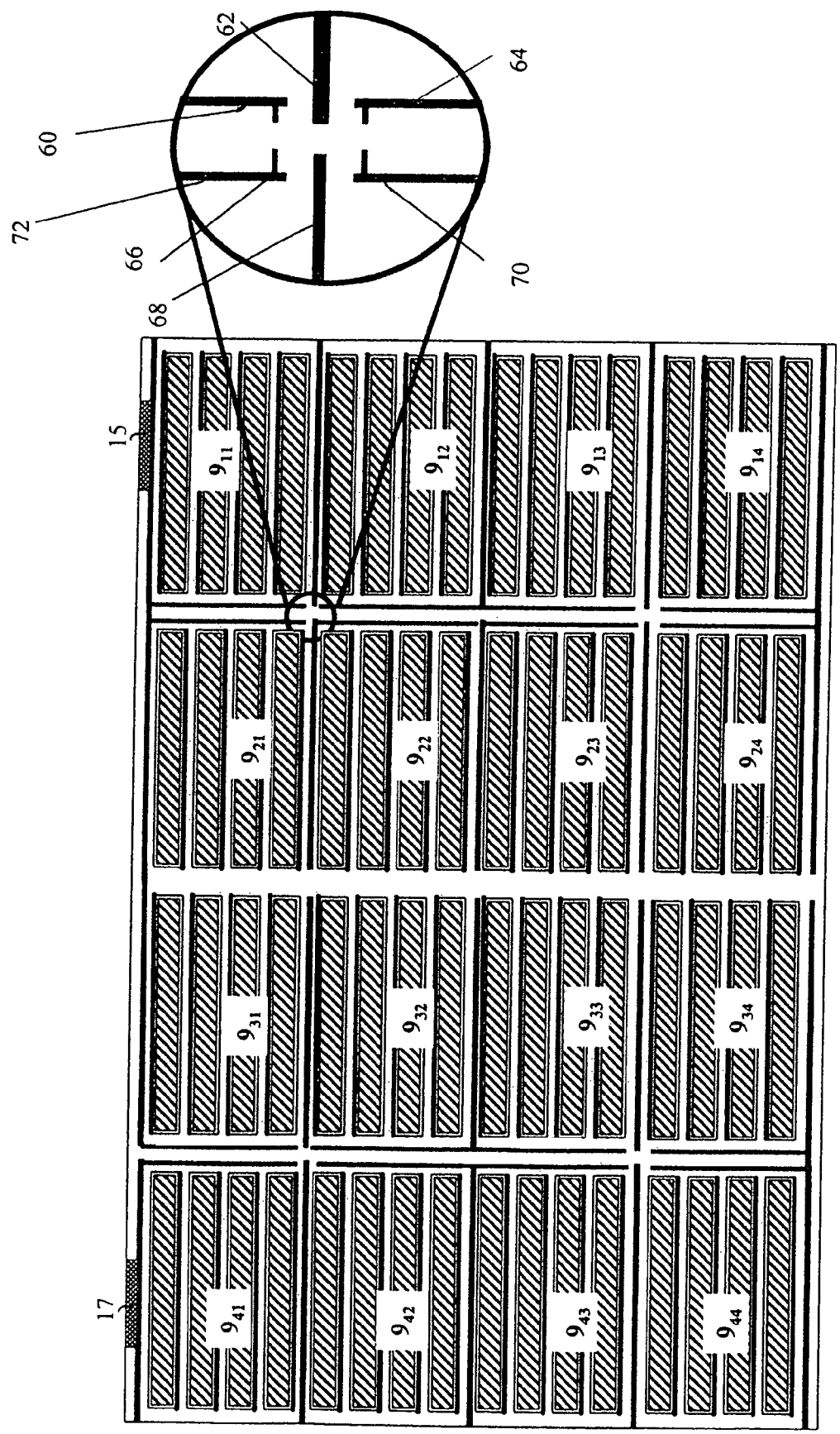
FIG. 18 is a schematic view seen through the substrate of a matrix of 16 serial-connected blocks comprising four serial-connected cells where each block can be disconnected by contacting the inner contact points.

FIG. 17 shows a schematic view of an example of a matrix of 16 series-connected blocks comprising 8 parallel-connected cells. FIG. 18 shows a front view of an example of a matrix of 16 series connected blocks comprising 4 series connected cells. Both FIG. 17 and FIG. 18 are seen from a bottom view, i.e. through the substrate.

FIGS. 17 and 18 include a magnified view of an intersection point at which the terminals for disconnecting the blocks are positioned. In the intersection point of the blocks $9_{11}$, $9_{12}$, $9_{21}$ and $9_{22}$ the outputs from these blocks are positioned, forming an inner contact point that can be reached after the matrix has been sealed (FIG. 17 and FIG. 18). If one or several cells in a block are detected to operate inappropriately, or should be protected against operating at negative voltages using diodes, the block can be disconnected by connecting the corresponding conductors. For instance, block $9_{11}$ is disconnected by connecting conductors 60 and 62, block $9_{12}$ is disconnected by connecting conductors 62 and 64, block $9_{21}$ is disconnected by connecting conductors 66 and 68 and block $9_{22}$ is disconnected by connecting conductors 70 and 68.

The access to the inner contact points 72 may be obtained through openings 74 of the encapsulation layer of the device, or through the second substrate in the cases where this is used for encapsulation, thus enabling disconnection of blocks after the matrix has been sealed. This also enables e.g. mounting diodes before encapsulation, whereupon the system can be closed without destroying the diodes due to e.g. pressure from the encapsulation material or from the second substrate. The free end F of the conductor $21_{ij}$ and the contact part C of the incoming or outgoing current collector 11, 13 are located inside of the rims of the opening 74. The free end F of the conductor $21_{ij}$ and the contact part C of the incoming or outgoing current collector 11, 13 are thus accessible via the opening 74. As is evident, one or more conductors may have their free ends within the same opening. IN the embodiment shown in the figures four free ends are accessible via the same opening. FIG. 19 shows the matrixes described above in FIGS. 17 and 18 seen from the encapsulation side, where openings 74 in the encapsulation material are indicated. Since FIG. 19 is a top view whereas FIG. 17 and FIG. 18 are bottom views, i.e. seen through the substrate, the positioning of the blocks is mirror-inverted in FIG. 17 and FIG. 18 in relation to FIG. 19. Moreover, it should be highlighted that in the configuration shown in FIG. 19, the encapsulation material is non-transparent and the cells are therefore not seen. In other cases, e.g. when using glass as a second substrate, one could see the cells. However, the openings 74 through the encapsulation material or second substrate would be made at the same locations. The terminals $T_{ij}$ are thus accessible via the openings in order to disconnect a selected block. The openings 74 may further be made prior to sealing of the system or after sealing of the system has been completed. The arrangement of the blocks in quadruples where the incoming and outgoing current collectors of respective block is positioned in direct vicinity to a conductor $21_{ij}$ for allowing disconnection of a block ensures that only one opening for each quadruple of blocks is sufficient. Two more openings 76 are preferable made in the encapsulation material or second substrate providing access to the terminals 15 and 17. Clearly, the latter may be obtained through simply reducing the size of the encapsulation material or the second substrate.

Disconnection may be possible by introduction of a bridge element connecting respective incoming or outgoing current collector 11, 13 with a selected conductor $21_{ij}$ at a terminal $T_{ij}$ such that connection between the current collector and the conductor is created. The bridge element may be formed by a soldering point or by any other suitable conductive element that may connect the incoming or outgoing current collector 11, 13 with a selected conductor $21_{ij}$. It may also be possible to connect respective incoming or outgoing current collector 11, 13 with a selected conductor $21_{ij}$ at a terminal $T_{ij}$ by inclusion of a diode, which would bypass the block in the event it works in negative bias thus disconnecting the block. The diode may be introduced prior to sealing the system of after the system has been sealed via access through either the sealing material or the substrate. When the diode is introduced before encapsulation of the system, it may be introduced e.g. after sintering of the electrodes, after applying a photo-sensitive dye, or after applying the electrolyte solution.

When a single cell or some of the cells in a photo-electrochemical system comprising serial-connected cells used as a device for conversion of light into electric energy have lower short-circuit current than the others due to e.g. partial shading, original differences, and/or different ageing of the cells, the current may pass through this or these cells under reverse bias, i.e. negative polarity, when the system is operated at currents higher than the short-circuit current of said cells. This may lead to degradation of the cells and will certainly lead to reduced efficiency of the system since energy is dissipated in cells under reverse bias. As a consequence of the invention, blocks that contain cells operating at reverse bias can be efficiently detected and disconnected, thus eliminating the need to discard the whole matrix.

An electrolyte is at least partially filled in said blocks of porous structures for forming a plurality of electrochemical cells before sealing the system, which is performed by application of an encapsulation covering on said plurality of blocks of porous structures.

The examples of the monolithic cells of a block have consisted of a single cell, a plurality of cells connected in series, and a plurality of cells connected in parallel. Obviously, it would be possible to combine serial- and parallel-connected cells in a block. One can imagine having different geometries within one block as long as the electrical output of the cells remains very similar for different cells. Likewise, one can imagine having different geometries in different blocks as long as the electrical output remains very similar for different blocks. The invention also relates to a method of operating a sealed monolithic electrochemical system comprising the method steps of:

providing an electrically insulating substrate,
arranging an electrically conducting pattern arranged to support a plurality of blocks of porous structures on said substrate, forming said plurality of porous structures on top of said conducting pattern, where each porous structure comprises a working electrode, an insulating layer and a counter electrode, wherein each block includes at least one porous, said plurality of blocks being arranged in a matrix (1) of series-connected blocks (2).

The method furthermore includes the step of forming, for each block in said plurality of blocks, a contact means 19 which contact means includes an incoming current collector 11 connected to one or more working electrodes of the block, an outgoing current collector 13 connected to one or more counter electrodes of the block, and a conductor $21_{ij}$ being connected with one of the incoming and outgoing current collector 11, 13 and extending toward the other of the incoming and outgoing current collector 11, 13 to at a short distance from said other of the incoming and outgoing current collector 11, 13 form a terminal $T_{ij}$ of a block.

Finally the method includes the step of disconnecting at least one of said blocks, said disconnection being formed by closing the terminal $T_{ij}$ of a block.

The disconnection may be made before or after an encapsulation cover seals the system.

Before the system is sealed the step of depositing an electrolyte to at least partially fill in said blocks of porous structures for forming a plurality of electrochemical cells is made.

Since disconnection preferably should be made after the cells have been tested for performance, it is preferred that disconnection is made after the electrolyte has been deposited and after the system has been sealed.

In order to achieve this it is preferred that the method further includes the step of covering said plurality of blocks of porous structures with an encapsulation covering, where said encapsulation covering includes a set of openings arranged to give access to the terminals $T_{ij}$ after the system has been sealed by the encapsulation.

In the description horizontal and vertical refers to directions in the plane of the drawing. Naturally the system can be installed in any direction when in use. The references to vertical and horizontal are purely references to different direction forming a plane in which a matrix of blocks are arranged. The same applies to the terms upwards and downwards in respective column of blocks.

The shape of the cells are preferably rectangular with connections for incoming working electrode and outgoing current electrode located along a longer side of the cell, giving a higher yield of the cell due to lower ohmic losses in the cell. However other configurations and shapes of the cells may be possible, as long as the cells can be arranged in a manner having a high surface efficiency. Hexagonal, rhombic and triangular shapes may be considered. However, the connection between the cells as well as the arrangement of the incoming current collectors, outgoing and the conductors will be more difficult.

The blocks also preferably have a rectangular shape. Other shapes of the blocks may be contemplated such as rhombic, hexagonal and triangular.

In the event the blocks are rhombic, the separation passages between the blocks in a row or blocks and/or columns of blocks will generally be inclined in the plane of the substrate. The separation passages will anyway cross each other and the location for an inner intersection area can likewise be found. In the event a hexagonal shape is contemplated, the inner intersection area will be formed at a location where three rather than four blocks are connected. In the event a triangular shape is contemplated, the inner intersection area will be formed where a plurality of blocks are connected, for instance six blocks in the event the block has the shape of a like-sided triangle.

The invention claimed is:

1. A sealed monolithic electrochemical system, comprising:
    an electrically insulating substrate;
    an electrically conducting pattern configured to support a plurality of blocks of porous structures arranged on said substrate, each porous structure including a working electrode, an insulating layer, a counter electrode, and an electrolyte at least partially filled in each porous structure for forming a plurality of electrochemical cells; and
    a contact device being included for each block in said plurality of blocks of porous structures, the contact device including an incoming current collector connected to one or more working electrodes of the block and an outgoing current collector connected to one or more counter electrodes of the block, said contact device further including a conductor connected with one of the incoming current collector and the outgoing current collector and extending toward the other of the incoming current collector and the outgoing current collector to a free end of said conductor, said free end being located at a distance from a contact part of said other of the incoming current collector and the outgoing current collector, and at the free end a terminal of the block is formed, said terminal being constituted by a gap formed between the free end of the conductor and said contact part of said other of the incoming current collector and the outgoing current collector, each block in said plurality of blocks being individually by-passable by only closing said gap of the associated terminal by an application of a short-circuiting element; and
    an encapsulation configured to cover said plurality of blocks, said plurality of blocks being arranged in a matrix of series-connected blocks, wherein said matrix of series-connected blocks includes at least one set of 2×2 blocks, said 2×2 blocks being arranged in a first column comprising an upper left block and a lower left block, a second column comprising an upper right block and a lower right block, a first row comprising said upper left block and said upper right block, and a second row comprising said lower left block and said lower right block, said first and second columns of said matrix being separated by a first passage and said first and second rows of said matrix being separated by a second passage, with an inner intersection area being provided in a crossing of said first and second passages at a location including a centre between the blocks, said contact devices being arranged at said inner intersection area, and said terminal of each block in said at least one set of 2×2 blocks being located in the inner intersection area.

2. The sealed monolithic electrochemical system according to claim 1, wherein the short-circuiting element closes the gap by connecting an incoming current collector of each respective block with an outgoing current collector of the same block.

3. The sealed monolithic electrochemical system according to claim 1, wherein said incoming current collector extends along the width of a respective block in said plurality of blocks on a first side of the respective block, said outgoing current collector extends along the width of the respective block on a second opposite side, and that said conductor extends on a side of the block.

4. The sealed monolithic electrochemical system according to claim 1, wherein a diode is connected to said contact device, whereby a respective block in said plurality of blocks is disconnected in the event the block operates in reverse direction.

5. The sealed monolithic electrochemical system according to claim 1, wherein the terminal is closed by application of a soldering point forming a short-circuit path.

6. The sealed monolithic electrochemical system according to claim 1, wherein the terminal is closed by application of a metallic pin forming a short-circuit path.

7. The sealed monolithic electrochemical system according to claim 1, wherein said matrix is of size m×n, where m and n are integers of value equal or greater than 3, and wherein said matrix includes at least one inner block being surrounded by blocks without having contact with an edge of the matrix.

8. The sealed monolithic electrochemical system according to claim 1, wherein the conductors are arranged in the vertical passage between blocks in two consecutive columns.

9. The sealed monolithic electrochemical system according to claim 1, wherein a lead through the substrate is provided at the inner intersection area in order to provide access to said incoming and outgoing current collectors of said at least one set of 2×2 blocks.

10. The sealed monolithic electrochemical system according to claim 1, wherein a lead through the encapsulation covering is provided at the inner intersection area in order to provide access to said incoming and outgoing current collectors of said at least one set of 2×2 blocks.

11. The A sealed monolithic electrochemical system according to claim 1, wherein said matrix includes a plurality of at least one set of 2×2 blocks, each having an inner intersection area.

12. The sealed monolithic electrochemical system according to claim 1, wherein each block contains a single electrochemical cell.

13. The sealed monolithic electrochemical system according to claim 1, wherein each block contains a plurality of electrochemical cells connected in parallel.

14. The sealed monolithic electrochemical system according to claim 1, wherein each block contains a plurality of electrochemical cells connected in series.

15. The sealed monolithic electrochemical system according to claim 1, wherein said electrochemical system is a photo-electrochemical system.

16. The sealed monolithic electrochemical system according to claim 1, wherein said electrochemical system includes at least one disconnected block which is disconnected by closing of the terminal of a respective block in said plurality of blocks.

17. A method of operating a sealed monolithic electrochemical system, comprising:
    providing an electrically insulating substrate;
    arranging an electrically conducting pattern, arranged to support a plurality of blocks of porous structures on the substrate;
    forming the plurality of blocks of porous structures on top of the conducting pattern, each porous structure of the plurality of blocks of porous structures including a working electrode, an insulating layer and a counter electrode, the plurality of blocks being arranged in a matrix of series-connected blocks;
    depositing an electrolyte to at least partially fill in the plurality of blocks of porous structures for forming a plurality of electrochemical cells;
    forming a contact device for each block in the plurality of blocks, the contact device including an incoming current collector connected to one or more working electrodes of the block and an outgoing current collector connected to one or more counter electrodes of the block,
        wherein a conductor is connected with one of the incoming current collector and the outgoing current collector and extends toward the other of the incoming current collector and the outgoing current collector to a free end of the conductor, the free end being located at a distance from a contact part of the other of the incoming current collector and the outgoing current collector, at the free end a terminal of the block being formed, the terminal being constituted by a gap formed between the free end of the conductor and said contact part of the other of the incoming current collector and the outgoing current collector, and said matrix includes at least one set of 2×2 blocks, said 2×2 blocks being arranged in a first column comprising an upper left block and a lower left block, a second column comprising an upper right block and a lower right block, a first row comprising said upper left block and said upper right block, and a second row comprising said lower left block and said lower right block, said first and second columns of said matrix being separated by a first passage and said first and second rows of said matrix being separated by a second passage, with an inner intersection area being provided in a crossing of said first and second passages at a location including a centre between the blocks, said contact device being arranged at said inner intersection area, said terminal of each porous structure of the at least one set of 2×2 blocks being located in the inner intersection area; and individually by-passing each one of the plurality of blocks by only closing said gap of the associated terminal of each block by an application of a short-circuiting element.

18. The method according to claim 17, further comprising: covering the plurality of blocks of porous structures with an encapsulation covering, where said encapsulation covering includes a set of openings configured to give access to the terminals after the system has been sealed by the encapsulation.

19. The sealed monolithic electrochemical system according to claim 1, wherein said conductors of said first and second columns are located in said first and second passages.

20. The sealed monolithic electrochemical system according to claim 1, wherein said conductor connected with one of the incoming current collector and the outgoing current collector extends in a first direction, and said one of the incoming current collector and the outgoing current collector to which the conductor is connected, extends in a second direction being perpendicular to said first direction.

21. The sealed monolithic electrochemical system according to claim wherein said first passage defines a first distance D, and said intersection area has a radial extension of less than 4*D, preferably less than 2*D.

* * * * *